United States Patent
Dhakshinamurthy et al.

(10) Patent No.: US 10,129,012 B2
(45) Date of Patent: Nov. 13, 2018

(54) TUNING CIRCUITRY AND OPERATIONS FOR NON-SOURCE-SYNCHRONOUS SYSTEMS

(71) Applicant: SanDisk Technologies LLC, Plano, TX (US)

(72) Inventors: Krishnamurthy Dhakshinamurthy, Bangalore (IN); Shajith Musaliar Sirajudeen, Bangalore (IN); Jayaprakash Naradasi, Bangalore (IN); Bhavin Odedara, Bangalore (IN); Yosi Pinto, Tel Aviv (IL); Rampraveen Somasundaram, Bangalore (IN); Anand Sharma, Karnataka (IN)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 15/473,067

(22) Filed: Mar. 29, 2017

(65) Prior Publication Data
US 2018/0083764 A1    Mar. 22, 2018

(30) Foreign Application Priority Data
Sep. 19, 2016   (IN) .............................. 201641031808

(51) Int. Cl.
*H04L 7/00* (2006.01)
(52) U.S. Cl.
CPC .......... *H04L 7/0012* (2013.01); *H04L 7/0037* (2013.01)

(58) Field of Classification Search
CPC ....... H04L 7/0012; H04L 7/0037; H03L 7/07; H03L 7/091
See application file for complete search history.

(56) References Cited

U.S. PATENT DOCUMENTS

| | | | |
|---|---|---|---|
| 6,940,768 B2 | 9/2005 | Dahlberg et al. | |
| 2009/0106460 A1* | 4/2009 | Suenaga | G06F 1/12 710/13 |
| 2010/0244913 A1* | 9/2010 | Golding | G06F 1/12 327/156 |
| 2010/0244916 A1 | 9/2010 | Kim | |
| 2011/0235459 A1* | 9/2011 | Ware | G11C 7/04 365/233.11 |
| 2014/0019792 A1* | 1/2014 | Oh | G06F 13/1689 713/501 |

(Continued)

*Primary Examiner* — Syed Haider
(74) *Attorney, Agent, or Firm* — Brinks Gilson & Lione

(57) ABSTRACT

A non-source-synchronous system may include a clock-sending device and a clock-receiving device that communicate via a communications bus. The clock-sending device and the clock-receiving device may perform a tuning operation, in which the clock-receiving device sends one or more data signals on one or more data lines of the communications bus to the clock-sending device. The clock-sending device may delay its internal clock signal by an amount based on the one or more data signals. The clock-sending device may then perform sampling of data signals received from the clock-receiving device based on the tuning operation. The tuning operation may be performed in accordance with SDR or DDR, and thus allow for SDR or DDR communication with optimal sampling for systems that do not use a data strobe.

30 Claims, 13 Drawing Sheets

(56) References Cited

U.S. PATENT DOCUMENTS

2015/0365081 A1* 12/2015 Lee .................. H03K 3/0375
375/316
2016/0164661 A1* 6/2016 Lin .................. H04L 7/0012
375/355

* cited by examiner

TUNING CIRCUITRY AND OPERATIONS FOR NON-SOURCE-SYNCHRONOUS SYSTEMS

CROSS-REFERENCE TO RELATED APPLICATIONS

This application claims priority to Indian Patent Application No. 201641031808, filed Sep. 19, 2016. The contents of Indian Patent Application No. 201641031808 are incorporated by reference in their entirety.

BACKGROUND

In a non-source-synchronous system in which a first device and a second device communicate data and commands to each other on a communications bus, the first device may send a clock signal to the second device, but the second device may not send a clock signal to the first device. In these systems, when the first device receives a data signal from the second device, the first device may use its own clock signal to determine when to sample the data signal in order to identify the logic levels or bit values of the data signal.

The second device may generate and send the data signal based on the clock signal it receives from the first device. In that regard, each cycle of the data signal may correspond to a particular clock cycle of the clock signal sent by the first device. Accordingly, if the first device is to receive a data signal from the second device, the first device may expect to receive a given cycle of the data signal within a certain time period from the time the first device sent the corresponding clock cycle used to generate the given data signal cycle. That certain time period may be referred to as clock-to-data loop delay (or simply loop delay).

The amount of the loop delay may depend on trace length of the communications bus connecting the first device and the second device and the delay provided by the internal circuitry of the second device to receive the clock signal and generate the data signal. The amount of the loop delay may vary for different non-source synchronous systems. For example, internal circuitries of two second devices made by two different manufacturers or even two devices made by the same manufacturer may provide different amounts of delay. Additionally, loop delay may change at different points in time for a given system or a given second device due to changes in temperature or other environmental conditions.

When a second device connects to a first device for communication, it is critical that the first device identify the amount of loop delay so that it knows when to sample the received data signal. Absent such an identification may cause the first device to sample the data signal at improper times, which in turn may cause the first device to identify the wrong logic levels and associated bit sequence of the data signal.

To identify the amount of loop delay, and in turn optimal sample points at which to sample the data signal, the first and second devices may perform a tuning operation. In one example tuning scheme, the second device sends the first device data signal having a predetermined data pattern, and the first device identifies the sampling points upon recognition of the data pattern. The data pattern may be set according to a protocol, such as a secure digital (SD) protocol. In addition, the first device may utilize a timing window for recognizing the data pattern. In some configurations, the timing window may be measured in terms of unit intervals (UI), with one unit interval (1 UI) and two unit intervals (2 UI) being common timing windows, and where one unit interval may be equal to one clock period. Data signals used for tuning that arrive outside of the timing window may not be recognized by the first device. As such, one downside of performing tuning using a timing window is the occurrence of tuning errors for second devices that provide too large of a loop delay.

Current non-source-synchronous systems, such as SD systems where a host device communicates with a SD device, may communicate according to a single data rate (SDR) data transfer mode, where data is transferred on only one clock transition—either the rising edge or the falling edge. As media resolutions increase, it may be desirable for non-source synchronous systems to switch to a double data rate (DDR) data transfer mode—where data is transferred on both the rising edge and the falling edge of the clock signal—in order to increase the data rate at which data is communicated on the communications bus.

Systems other than non-source-synchronous systems that communicate using DDR may utilize a synchronous line (e.g., a strobe line) to communicate a synchronization signal from the second device to the first device along with the data signal on the data line. Common names for the synchronization signal may include Data Strobe, Enhanced Strobe and Returned Clock (RCLK). The first device may use the synchronization signal to determine when to sample the incoming data signal. However, non-source-synchronous systems, such as SD systems, do not use a synchronization signal, the communications bus connecting the first device and the second device does not include a synchronous line, and adding such a synchronous line may undesirably increase the cost for such systems.

As such, a new tuning scheme for non-source-synchronous systems that can be used for DDR data transfer and that do not depend on a timing window and/or a synchronous signal communicated on a synchronous line may be desirable.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION

Overview

Figure 1:
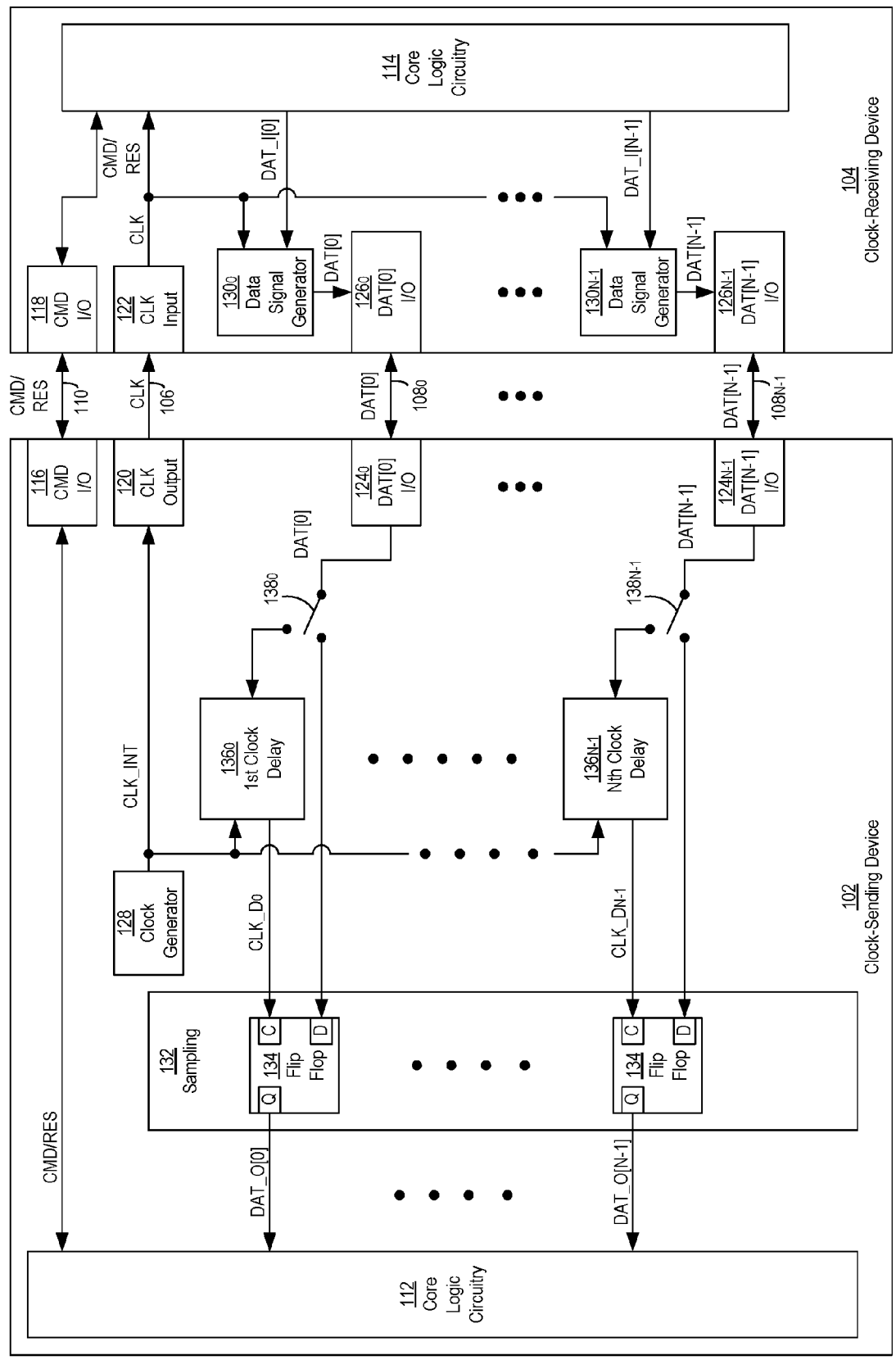
FIG. 1 is a block diagram of an example non-source synchronous system.

The following embodiments describe non-source-synchronous systems and related methods in which clock-sending devices and clock-receiving devices communicate to perform a tuning operation that can be used for single data rate (SDR) or double data rate (DDR) communication and that does not rely on tuning windows. In one embodiment, a clock-sending device includes: a clock generator, input/output circuitry, clock delay circuitry, and sampling circuitry. The clock generator is configured to generate an internal clock signal. The input/output circuitry is configured to generate a host clock signal based on the internal clock signal, send the host clock signal to a clock-receiving device, and receive a first data signal from the clock-receiving device, where the first data signal is generated based on the host clock signal. The clock delay circuitry is configured to edge align the internal clock signal to the first data signal to generate an edge-aligned clock signal. The sampling circuitry is configured to sample a second data signal received from the clock-receiving device based on the edge-aligned clock signal.

In some embodiments, the clock delay circuitry is configured to delay the edge-aligned clock signal by a predetermined phase amount to generate the delayed clock signal, and the sampling circuitry is configured to sample the second data signal according to transitions of the delayed clock signal.

In some embodiments, the clock delay circuitry is configured to edge align the internal clock signal to a rising edge of a first data signal to generate a first edge-aligned clock signal, and is further configured to edge align the internal clock signal to a falling edge of the first data signal to generate a second edge-aligned clock signal. The sampling circuitry is configured to sample the second data signal based on the first edge-aligned clock signal and based on the second edge-aligned clock signal.

In some embodiments, a predetermined phase amount by which an edge-aligned clock signal is delayed is 90 degrees where the clock-sending device and the clock-receiving device are configured to communicate according to double data rate (DDR), and wherein the predetermined phase amount is 180 degrees where the clock-sending device and the clock-receiving device are configured to communicate according to single data rate (SDR).

In some embodiments, the clock delay circuitry is configured to delay the edge aligned-clock signal by a second phase amount to generate a second delayed clock signal, and the sampling circuitry is configured to sample the second data signal based on the first delayed clock signal and based on the second delayed clock signal.

In some embodiments, the first phase amount is 90 degrees and the second phase amount is 270 degrees.

In some embodiments, the input/output circuitry is configured to receive the second data signal from a first data line of a communications bus connecting the clock-sending device and the clock-receiving device, and receive a third data signal from a second data line of the communications bus. In addition, the sampling circuitry is configured to sample the third data signal based on the delayed clock signal.

In some embodiments, the input/output circuitry is configured to receive a third data signal from the clock-receiving device, where the third clock-signal is generated based on the host clock signal. The clock delay circuitry is configured to delay the internal clock signal based on the third data signal to generate a second delayed clock signal, and the sampling circuitry is configured to sample a fourth data signal based on the second delayed clock signal.

In some embodiments, the first data signal includes a clock pattern.

In some embodiments, the clock delay circuitry is configured to delay the internal clock signal by an amount based on a loop delay associated with the clock-sending device and the clock-receiving device.

In some embodiments, the clock delay circuitry is configured to set an amount of delay to delay the internal clock signal during a tuning operation, and the sampling circuitry is configured to sample the second data signal after the tuning operation is complete.

In some embodiments, core logic circuitry is configured to determine to perform the tuning operation. The input/output circuitry is configured to send a tuning command to the clock-receiving device in response to the determination, and receive the first data signal from the clock-receiving device in response to sending the tuning command.

In some embodiments, the core logic circuitry is configured to determine to perform the tuning operation in response to a triggering event. The triggering event includes one of: completing a change of a data line usage number, completing an establishment of whether to communicate according to single data rate (SDR) or double data rate (DDR), determining to change a frequency of the internal clock signal, identifying errors in a received data set, or entering into an idle mode.

In some embodiments, the clock-receiving device is a secure digital (SD) device.

In some embodiments, the input/output circuitry is connected to the clock-receiving device via a communications bus that does not include a strobe line.

In a second embodiment, a tuning method is performed. The tuning method includes: receiving, with clock delay circuitry of a first device, a first data signal from a second device, where the first data signal is generated based on a clock signal output from the first device to the second device. In addition, the tuning method includes edge aligning, with the clock delay circuitry, an internal clock signal to the first data signal to generate an edge-aligned clock signal, and sampling, with sampling circuitry of the first device, a second data signal based on the edge-aligned clock signal.

In some embodiments, edge aligning the internal clock signal includes edge aligning, with the clock delay circuitry, the internal clock signal to a rising edge of a first data signal to generate a first edge-aligned clock signal, and edge aligning, with the clock delay circuitry, the internal clock signal to a falling edge of the first data signal to generate a second edge-aligned clock signal. Also, sampling the second data signal includes sampling, with a first sampling circuit of the sampling circuitry, the second data signal based on the first edge-aligned clock signal, and sampling, with a second sampling circuit of the sampling circuitry, the second data signal based on the second edge-aligned clock signal.

In some embodiments, the method includes delaying, with the clock delay circuitry, the edge-aligned clock signal by a predetermined phase amount to generate a delayed clock signal; and receiving, with the sampling circuitry, the delayed clock signal from the clock delay circuitry. In addition, sampling the second data signal includes sampling, with the sampling circuitry, the second data signal based on the received delayed clock signal.

In some embodiments, the method includes delaying, with the clock delay circuitry, the edge aligned-clock signal by a second phase amount to generate a second delayed clock signal. Sampling the second data signal includes sampling, with a first sampling circuit of the sampling circuitry, the second data signal based on the first delayed clock signal, and sampling, with a second sampling circuit of the sampling circuitry, the second data signal based on the second delayed clock signal.

In some embodiments, the method includes: receiving, with input/output circuitry of the first device, the second data signal from a first data line of a communications bus connecting the first device and the second device; receiving, with the input/output circuitry, a third data signal from a second data line of the communications bus; and sampling, with the sampling circuitry, the third data signal based on the edge-aligned clock signal.

In some embodiments, the method includes: receiving, with the clock delay circuitry, a third data signal from the second device, the third data signal generated based on the clock signal; edge aligning, with the clock delay circuitry, the internal clock signal to the third data signal to generate a second edge-aligned clock signal; and sampling, with the sampling circuitry, a fourth data signal based on the second edge-aligned clock signal.

In some embodiments, edge aligning the internal clock signal is performed during a tuning operation, and sampling the second data signal is performed after the tuning operation is complete.

In some embodiments, the method includes: determining, with core logic circuitry of the first device, to perform the tuning operation; sending, without input/output circuitry of the first device, a tuning command to the second device; and receiving, with the input/output circuitry, the first data signal from the second device in response to sending the tuning command.

In a third embodiment, a tuning method is performed. The tuning method includes: dynamically delaying, with clock delay circuitry of a first device, an internal clock signal to generate a delayed clock signal until the delayed clock signal is edge aligned to a first data signal; and sampling, with sampling circuitry of the first device, a second data signal based on the delayed internal clock signal.

In a fourth embodiment, a clock-sending device includes: means for generating an internal clock signal; means for generating a host clock signal based on the internal clock signal and for sending the host clock signal to a clock-receiving device; means for receiving a first data signal from the clock-receiving device, the first data signal generated based on the host clock signal; means for edge aligning the internal clock signal to the first data signal to generate an edge-aligned clock signal; and means for sampling a second data signal received from the clock-receiving device based on the edge-aligned clock signal.

Other embodiments are possible, and each of the embodiments can be used alone or together in combination. Accordingly, various embodiments will now be described with reference to the attached drawings.

Embodiments

FIG. 1 shows a block diagram of an example non-source-synchronous system that includes a clock-sending device 102 and a clock-receiving device 104. The clock-sending device 102 and the clock-receiving device 104 may each be additionally or alternatively be referred to as systems or apparatuses. In the non-source-synchronous system, the clock-sending device 102 may be configured to generate a clock signal and send the clock signal to the clock-receiving device 104, and the clock-receiving device 104 may not generate its own clock signal or send a clock signal to the clock-sending device 102. Instead, the clock-receiving device 104 may be configured to operate and communicate with the clock-sending device 102 using the clock signal received from the clock-sending device 102.

In some examples, the clock-sending device 102 may be a host or a master system or apparatus, and the clock-receiving device 104 may be a slave system or apparatus. In addition or alternatively, the clock-receiving device 104 may have or store information or data that the clock-sending device 102 wants. The clock signal sent by the clock-sending device 102 may be used in order to transfer the desired information or data from the clock-receiving device 104 to the clock-sending device 102. As used herein, the clock signal sent by the clock-sending device 102 to the clock-receiving device 104 may be referred to as a host clock signal.

The clock-sending device 102 and the clock-receiving device 104 may be connected or coupled to each other via a communications bus on which the devices 102, 104 send and receive signals to each other. In general, the devices 102, 104 may include input and output circuitry configured to generate the signals by pulling up lines of the communications bus to a high voltage level (e.g., a voltage level associated with a logic "1"), and pulling down the lines to a low level (e.g., a voltage level associated with a logic "0").

The communications bus may include a host clock line 106 on which the clock-sending device 102 may send a host clock signal CLK to the clock-receiving device 104; an N-number of data lines $108_0$ to $108_{N-1}$ on which the clock-sending device 102 and the clock-receiving device 104 may communicate an N-number of data signals DAT[0] to DAT[N-1] with each other; and a command line 110 on which the clock-sending device 102 and the clock-receiving device 104 may communicate command signals CMD and responses RES with each other. The data signals may include data that the clock-sending device 102 wants to receive from the clock-receiving device 104, or data that the clock-sending device 102 wants to send to the clock-receiving device 104, such as for purposes of storage. Example numbers for N may be 4 or 8, although other numbers may be possible. Additionally, command signals CMD sent from the clock-sending device 102 may instruct or request that the clock-receiving device 104 perform some action, such as perform an operation, transition into a certain state, or respond with requested data or information, as examples.

The response signals RES sent from the clock-receiving device 104 may acknowledge receipt of the command signals CMD, indicate that the instructed/action is performed, or include the requested information, as examples. As described in further detail below, the host clock signal CLK may set the frequency at which data and/or commands are communicated on the communications bus 110 and/or control the data flow by providing the times and/or rates at which the data signals are generated by the clock-receiving device 104.

In addition, each of the clock-sending device 102 and the clock-receiving device 104 may include respective core logic circuitries 112, 114 that may perform functions specific to their respective devices 102, 104. In one application, the core logic circuitry 114 may be the component of the clock-receiving device 104 that is responsible for controlling the transmission and receipt of data or other information to and from the clock-sending device 102. In addition or alternatively, the core logic circuitries 112, 114 may be configured to generate commands and responses to enable the communication between the devices 102, 104.

Also, each of the clock-sending device 102 and the clock-receiving device 104 may include various input and output circuits coupled to the communications bus and configured to send and/or receive command, data, or clock signals on associated lines of the communications bus. In particular, each of the clock-sending device 102 and the clock-receiving device 104 may include command signal input/output (CMD I/O) circuits 116, 118, respectively, each configured to send and receive commands and responses generated by and received from their respective core logic circuitries 112, 114. In addition, the clock-sending device 102 may include a clock output circuit 120 configured to send the host clock signal CLK on the host clock line 106, and the clock-receiving device 104 may include a clock input circuit 122 configured to receive the host clock signal CLK from the host clock line 106. Additionally, the clock-sending device 102 data may include data input/output (I/O) circuits $124_0$ to $124_{N-1}$ configured to send and receive data signals DAT[0] to DAT[N-1] on the data lines $108_0$ to $108_{N-1}$. Similarly, the clock-receiving device 104 may include data input/output (I/O) circuits $126_0$ to $126_{N-1}$ configured to send and receive data signals DAT[0] to DAT[N-1] on the data lines $108_0$ to $108_{N-1}$.

Each of the input, output, and input/output circuits 116, 118, 120, 122, $124_0$ to $124_{N-1}$, and $126_0$ to $126_{N-1}$ may include various types of circuits to communicate signals between the communications bus and the internal circuitries of their respective devices 102, 104. Example types of circuits include driver circuits, pre-driver circuits, level shifters, buffers, multiplexers, Schmitt triggers, or other similar types of circuits.

In addition, although not shown in FIG. 1 for clarity, the clock-sending device 102 may supply one or more supply voltages on one or more supply lines to the clock-receiving device 104 to power components of the clock-receiving device 104. Voltages supplied to circuit components of the clock-receiving device 104 may be generated based on the supply voltage(s). For example, although not shown in FIG. 1, the clock-receiving device 104 may include regulator circuitry configured to receive the supply voltage(s), and based on receipt of the supply voltage(s), the regulator circuitry may be configured to generate one or more voltages in or more voltage domains. The input, output, and input/output circuits 116, 118, 120, 122, $124_0$ to $124_{N-1}$, and $126_0$ to $126_{N-1}$ may be configured to communicate the command, clock, and data signals according to the voltage domains.

Additionally, as shown in FIG. 1, the clock-sending device 102 may include a clock generator circuit 128 that is configured to generate the host clock signal CLK. In particular, the clock generator 128 may be configured to generate an internal clock signal CLK_INT and send the internal clock signal CLK_INT to the clock output circuit 120. In response, the clock output circuit 120 may generate the host clock signal CLK and output the host clock signal CLK on the host clock line 106. In general, the internal clock signal CLK_INT output by the clock generator 128 and the host clock signal CLK output by the clock output circuit 120 may be similar, such as by having the same clock frequency. However, the clock output circuit 120 may change the voltage domain and/or the drive power of the internal clock signal CLK_INT in order to output a clock signal that is suitable for transmission on the clock line 106.

The clock-receiving device 104 may use the host clock signal CLK received on the clock line 106 to generate the data signals DAT[0] to DAT[N-1] that are sent back to the clock-sending device 102. In particular, the clock receiving device 104 may include data signal generator circuits $130_0$ to $130_{N-1}$, each configured to receive the host clock signal CLK (or at least a buffered version of the host clock signal CLK) from the clock input circuit 122 and a respective internal data signal DAT_I[0] to DAT_I[N-1] from the core logic circuitry 114. Based on receipt of the host clock signal CLK and the respective internal data signal DAT_I[0] to DAT_I[N-1], each of the data signal generators $130_0$ to $130_{N-1}$ may generate a respective one of the data signals DAT[0] to DAT[N-1] according to the logic levels of the internal data signal it receives from the core logic circuitry 114 and the rate of the host clock signal CLK (i.e., according to the rising and/or falling edge occurrences of the host clock signal CLK) received from the clock input circuit 122. In some configurations, each of the data signal generator circuitries $130_1$ to $130_{N-1}$ may include flip-flop circuitry, such as one or more D flip-flop circuits, where the host clock signal CLK is sent to the clock inputs and the internal data signals DAT_I[0] to DAT_I[N-1] are sent to the data inputs of the flip flops. Other configurations for the data signal generator circuitries $130_0$ to $130_{N-1}$ may be possible.

Each of the internal data signals DAT_I[0] to DAT_I[N-1] may have a data pattern that includes a series or sequence of high and low voltage levels corresponding to "0" and "1" logic levels or bit values. The pattern may represent a bit sequence of a data set that the core logic circuitry 114 wants sent to the clock-sending devices 102. The internal data signals DAT_I[0] to DAT_I[N-1] may be generated by the core logic circuitry 114 in accordance with SDR or DDR. As shown in FIG. 1, the clock input circuitry 122 may also send the host clock signal CLK to the core logic circuitry 114, which may use the host clock signal CLK to generate the internal data signals DAT_I[0] to DAT_I[N-1] and/or perform other functions.

Upon receiving the data signals DAT[0] to DAT[N-1], the data I/O circuits $124_0$ to $124_{N-1}$ may provide the data signals DAT[0] to DAT[N-1] to sampling circuitry 132 of the clock-sending device 102. The sampling circuitry 132 may be configured to sample or capture the voltage levels of the data signals DAT[0] to DAT[N-1] at certain points in time, referred to as sampling points. The sampling circuitry 132 may be configured to generate output data signals DAT_O[0] to DAT_O[N-1] based on the sampled or captured voltage levels, and provide the output data signals DAT_O[0] to DAT_O[N-1] to the core logic circuitry 112 for further processing.

As shown in FIG. 1, an example circuit configuration for the sampling circuitry 132 may include D flip flops 134. The data I/O circuits $124_0$ to $124_{N-1}$ may be configured to send the data signals DAT[0] to DAT[N-1] to data ("D") inputs of the D flip flops 134. In addition, as described in further detail below, each of the D flip flops 134 may have a clock ("C") input that is configured to receive a respective one of a plurality of delayed clock signals $CLK\_D_0$, to $CLK\_D_{N-1}$. Each D flip flop 134 may be configured to sample or capture the levels of the data signal it is receiving in response to rising transitions (i.e., at the rising edges) or falling edges (i.e., at the falling edges) of a respective one of the delayed clock signals $CLK\_D_0$ to $CLK\_D_{N-1}$ it is receiving. Hereafter, for the various example embodiments shown in FIGS. 1-11, the sampling circuitry and the flip flops of the sampling circuitry is described as sampling data according to the rising edges of the delayed clock signals. However, in other embodiments, sampling may be performed according to the falling edges or a combination of the rising edges and the falling edges of the delayed clock signals. Additionally, each D flip flop 134 may output the sampled or captured levels of the data signal it is receiving at its "Q" output.

In addition, since the internal clock signal CLK_INT, and in turn the host clock signal CLK, is used to generate the data signals DAT[0] to DAT[N-1], a given cycle of a data signal may correspond to a particular cycle of the internal clock signal CLK_INT used to generate that given data signal cycle. In that regard, when the clock-sending device 102 is to receive a data signal, a certain time period may elapse from the time the clock-sending device 102 generates a particular clock cycle of the internal clock signal CLK_INT, to the time that a corresponding cycle of a data signal that was generated using that particular clock cycle is received by the sampling circuitry 132. That certain time period may be referred to as clock-to-data loop delay (or simply loop delay), and the amount of the loop delay may depend on the trace length of the clock signal path and the data signal path between the clock-sending device 102 and the clock-receiving device 104, in addition to the delay provided by the internal circuitry of the clock-receiving device 104 that receives the host clock signal CLK and generates and outputs the data signals DAT[0] to DAT[N01], including the clock input circuitry 122, the data signal generator circuitries $130_0$ to $130_{N-1}$, and the data output circuitries $126_0$ to $126_{N-1}$.

Since the clock-receiving device 104 does not send its own clock signal (or other similar type of synchronization signal such as a data strobe signal) for the clock-sending device 102 to use to sample the data signals DAT[0] to DAT[N-1], the clock-sending device 102 may use its own internal clocking to sample the data signals DAT[0] to DAT[N-1]. In order to accurately or reliably identify the data pattern of the data signals DAT[0] to DAT[N-1], the clock-sending device 102 may want to capture or sample the voltage levels of the data signals DAT[0]-DAT[N-1] at optimal sample points in time, which, in general, may be at or near the center or middle of a duration within a data cycle that a constant voltage level of a data signal is maintained. In order to sample the data signals DAT[0] to DAT[N-1] at optimal sample points, the clock-sending device 102 may identify the loop delay. That is, if the clock-sending device 102 does not identify the loop delay, the sampling circuitry 132 may sample the data signals DAT[0] to DAT[N-1] at undesirable sampling points, which in turn may cause the sampling circuitry 132 to capture incorrect voltage levels and/or the core logic circuitry 112 to identify wrong bit values of the data signals DAT[0] to DAT[N-1].

In order to identify the loop delay and ultimately optimum sample points, the clock-sending device 102 and the clock-receiving device 104 may enter into a tuning phase and/or perform a tuning operation. In the non-source synchronous system of FIG. 1, the clock-sending device 102 time-shifts or delays the internal clock signal CLK_INT by an amount corresponding to the loop delay. To do so, the clock-sending device 102 may include a tuning system that includes clock delay circuitry configured to delay the internal clock signal CLK_INT by an amount corresponding and/or equal to the loop delay. The clock delay circuitry may perform the delaying by edge aligning the internal clock signal CLK to at least one of the received data signals DAT[0] to DAT[N-1]. The clock delay circuitry may further be configured to delay the edge aligned clock signal by a phase amount in order for the sampling circuitry 132 to sample the data signals at optimal sampling points.

For the example configuration shown in FIG. 1, the clock delay circuitry may include an N-number of clock delay circuits $136_0$ to $136_{N-1}$, each configured to receive the internal clock signal CLK_INT and a respective one of the data signals DAT[0] to DAT[N-1], and edge align a rising edge of the internal clock signal CLK_INT it receives relative to a rising or falling edge of the respective one of the data signals DAT[0] to DAT[N-1]. For example, as shown in FIG. 1, a first delay circuit $136_0$ may be configured to receive a first data signal DAT[0] and edge align the rising edges of the internal clock signal CLK_INT it receives to a rising or falling edge of the first data signal DAT[0], and an Nth delay circuit $136_{N-1}$ may be configured to receive an Nth data signal DAT[N-1] and edge align rising edge of the internal clock signal CLK_INT it receives to a rising or falling edge of the Nth data signal DAT[N-1]. Each of the clock delay circuits $136_0$ to $136_{N-1}$ may further be configured to time-shift or delay their respective edge aligned clock signals by an additional phase amount to generate a respective delayed clock signal $CLK\_D_0$ to $CLK\_D_{N-1}$. Each of the clock delay circuits $136_0$ to $136_{N-1}$ may output their respective delayed clock signal $CLK\_D_0$ to $CLK\_D_{N-1}$ to the sampling circuitry 132, such as to a clock input of an associated flip flop circuit 134.

In addition, as shown in FIG. 1, the clock-sending device 102 may include switching circuits $138_0$ to $138_{N-1}$ configured in between the data I/O circuits $124_0$ to $124_{N-1}$ and the clock delay circuits $136_0$ to $136_{N-1}$. The switching circuits $138_0$ to $138_{N-1}$ may be configured to alternatingly connect the data I/O circuits $124_0$ to $124_{N-1}$ with the clock delay circuits $136_0$ to $136_{N-1}$ and the sampling circuitry 132.

When the core logic circuitry 112 determines to enter into the tuning phase and/or perform the tuning operation, the core logic circuitry 112 may control the switching circuits $138_0$ to $138_{N-1}$ so that the data I/O circuits $124_0$ to $124_{N-1}$ are connected to the clock delay circuits $136_0$ to $136_{N-1}$. Then, upon receipt of the data signals DAT[0] to DAT[N-1] from the clock-receiving device 104 to perform the tuning operation, the data I/O circuits $124_0$ to $124_{N-1}$ may route the data signals DAT[0] to DAT[N-1] to the clock delay circuits $136_0$ to $136_{N-1}$ via the switching circuits $138_0$ to $138_{N-1}$. In response to receipt of the data signals DAT[0] to DAT[N-1], the delay circuits $136_0$ to $136_{N-1}$ may perform their respective time-shifting or delaying of the internal clock signal CLK_INT in order to generate the delayed clock signals $CLK\_D_0$ to $CLK\_D_{N-1}$.

After the tuning operation is finished, the core logic circuitry 112 may determine to exit the tuning phase, and in response, control the switching circuits $138_0$ to $138_{N-1}$ to connect the data I/O circuits $124_0$ to $124_{N-1}$ to the sampling circuitry 132, such as to data inputs of associated flip flops 134. Subsequently, upon exiting the tuning phase, when the clock-receiving device 104 sends data signals DAT[0] to DAT[N-1] on the data lines $108_0$ to $108_{N-1}$ to the clock-sending device 102, such as in a normal operation mode for example, the data I/O circuits $124_0$ to $124_{N-1}$ may route the received data signals DAT[0] to DAT[N-1] to the sampling circuitry 132. The sampling circuitry 132 may sample the data signals DAT[0] to DAT[N-1] at sample points determined by the delayed clock signals $CLK\_D_0$ to $CLK\_D_{N-1}$ instead of the internal clock signal CLK_INT. Data output signals DAT_O[0] to DAT_O[N-1] generated by the sampling circuits in response to receipt of the data signals DAT[0] to DAT[N-1] and the delayed clock signals $CLK\_D_0$ to $CLK\_D_{N-1}$ may be sent to the core logic circuitry 112 for further processing.

The clock delay circuits $136_0$ to $136_{N-1}$ may be configured to delay the internal clock signal CLK_INT to generate the delayed clock signals $CLK\_D_0$ to $CLK\_D_{N-1}$ for single data rate (SDR) data transfer between the clock-sending device 102 and the clock-receiving device 104, as opposed to double data rate (DDR) data transfer. In general, in SDR data transfer, data is transferred on only one clock transition—either the rising edge or the falling edge, whereas in DDR data transfer, data is transferred on both the rising edge and the falling edge of the clock signal. With respect to the edge alignment performed with the delay circuitry in FIG. 1, the clock delay circuits $136_0$ to $136_{N-1}$ may be configured to edge align the rising edge of the internal clock signal CLK_INT relative to either the rising edge or the falling edge of the data signals DAT[0] to DAT[N-1].

Figure 2:
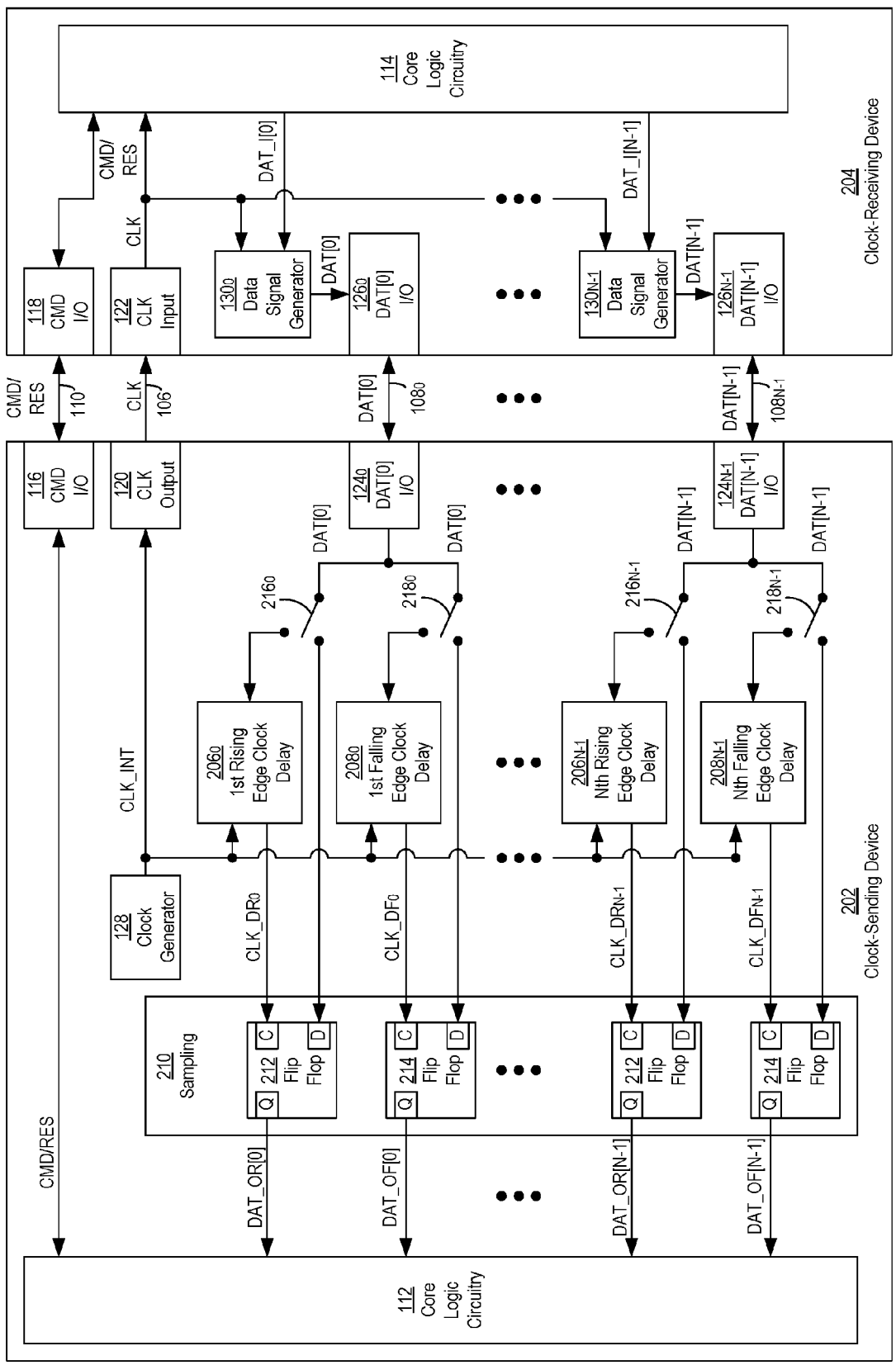
FIG. 2 is a block diagram of another example non-source synchronous system.

FIG. 2 shows another example non-source-synchronous system that includes a clock-sending device 202 and a clock-receiving device 204. The non-source-synchronous system of FIG. 2 is similar to the non-source-synchronous system of FIG. 1, except that instead of being configured for SDR data transfer, the clock-sending device 202 is configured for double data rate (DDR) data transfer. One way to implement sampling circuitry in accordance with DDR data transfer is to perform two parallel sampling operations for a given data signal. As shown in FIG. 2, sampling circuitry 210 may include two sets of flip flop circuits, including flip flops 212 configured to perform rising-edge sampling of the data signals DAT[0] to DAT[N-1], and flip flops 214 configured to perform falling-edge sampling of the data signals DAT[0] to DAT[N-1]. Rising-edge sampling may be the sampling at points of a data signal corresponding to data transferred on the rising edge of a clock signal, and falling-edge sampling maybe sampling at points of a data signal corresponding to data transferred on the falling edge of a clock signal. The flip flops 212, 214 may be configured similarly, in that both types may be configured to sample the incoming data signal in response to the same edge transition, such as the rising edge for example. In order for the flip flops 212 to perform rising-edge sampling and the flip flops 214 to perform falling-edge sampling, falling edge delayed clock signals $CLK\_DF_0$ to $CLK\_DF_{N-1}$ provided to flip flops 214 may be 180 degrees out of phase from rising edge delayed clock signals $CLK\_DR_0$ to $CLK\_DR_{N-1}$ that are provided to flip flops 212.

In order to generate the rising edge and falling edge delayed clock signals $CLK\_DR_0$ to $CLK\_DR_{N-1}$, $CLK\_DF_0$ to $CLK\_DF_{N-1}$, clock delay circuitry of the clock-sending device 202 may include an N-number of pairs of clock delay circuits, with each pair including a rising edge clock delay circuit 206 and a falling edge clock delay circuit 208. Each of the rising edge clock delay circuits $206_0$ to $206_{N-1}$ may be configured to edge align a rising edge of the internal clock signal CLK_INT to the rising edge of a respective one of the data signals DAT[0] to DAT[N-1] it receives in order to generate and output a respective one of a plurality of rising edge delayed clock signals $CLK\_DR_0$ to $CLK\_DR_{N-1}$. For example, a first rising edge clock delay circuit $206_0$ may be configured to edge align the rising edge of the internal clock signal CLK_INT it receives to the rising edge of the first data signal DAT[0] in order to generate a first rising edge delayed clock signal $CLK\_DR_0$, and the Nth rising edge clock delay circuit $206_{N-1}$ maybe configured to edge align the rising edge of the internal clock signal CLK_INT it receives to the rising edge of the Nth data signal DAT[N-1] in order to generate an Nth rising edge delayed $CLK\_DR_{N-1}$. Similarly, each of the falling edge clock delay circuits $208_0$ to $208_{N-1}$ may be configured to edge align a rising edge of the internal clock signal CLK_INT to the falling edge of a respective one of the data signals DAT[0] to DAT[N-1] it receives in order to generate and output a respective one of a plurality of falling edge delayed clock signals $CLK\_DF_0$ to $CLK\_DF_{N-1}$. For example, a first falling edge clock delay circuit $208_0$ may be configured to edge align the rising edge of the internal clock signal CLK_INT it receives to the falling edge of the first data signal DAT[0] in order to generate a first falling edge delayed clock signal $CLK\_DR_0$, and the Nth falling edge clock delay circuit $208_{N-1}$ may be configured to edge align the rising edge of the internal clock signal CLK_INT it receives to the falling edge of the Nth data signal DAT[N-1] in order to generate an Nth falling edge delayed $CLK\_DR_{N-1}$.

Similar to non-source-synchronous system of FIG. 1, the rising and falling edge delay circuits $206_0$ to $206_{N-1}$, $208_0$ to $208_{N-1}$ may send the rising and falling edge delayed clock signals $CLK\_DR_0$ to $CLK\_DR_{N-1}$, $CLK\_DF_0$ to $CLK\_DF_{N-1}$ to sampling circuitry 210, such as to clock inputs of associated flip flop circuits 212, 214.

Also, the clock-sending device 202 may include switching circuitry in between the data I/O circuits $124_0$ to $124_{N-1}$ and the clock delay circuitry that is configured to route the data signals DAT[0] to DAT[N-1] to both the rising edge delay circuits $206_0$ to $206_{N-1}$ and the falling edge delay circuits $208_0$ to $208_{N-1}$ in the tuning phase. For the example configuration shown in FIG. 2, the switching circuitry may include first switching circuits $216_0$ to $216_{N-1}$ and second switching circuits $218_0$ to $218_{N-1}$. In the tuning phase and/or to perform the tuning operation, the core logic circuitry 112 may control the first switching circuits $216_0$ to $216_{N-1}$ so that each of the first switching circuits $216_0$ to $216_{N-1}$ routes a respective one of the data signals DAT[0] to DAT[N-1] to an associated one of the rising edge clock delay circuits $206_0$ to $206_{N-1}$. Similarly, the core logic circuitry 112 may control the second switching circuits $218_0$ to $218_{N-1}$ so that each of the second switching circuits $218_0$ to $218_{N-1}$ routes a respective one of the data signals DAT[0] to DAT[N-1] to an associated one of the falling edge clock delay circuits $208_0$ to $208_{N-1}$. Outside of the tuning phase, such as in a normal data transfer mode, the core logic circuit 112 may control the switching circuits $216_0$ to $216_{N-1}$, $218_0$ to $218_{N-1}$ so that the data signals DAT[0] to DAT[N-1] are routed to the sampling circuitry 210, such as to data inputs of flip flops 212, 214. Configurations for the switching circuitry other than that shown in FIG. 2 may be possible.

When the switching circuits $216_0$ to $216_{N-1}$, $218_0$ to $218_{N-1}$ connect the data I/O circuits $124_0$ to $124_{N-1}$ to the sampling circuitry 210, the sampling circuitry 210, such as with the flip flops 212, may be configured to perform rising-edge sampling of each of the data signals DAT[0] to DAT[N−1] according to the rising edges of the rising edge delayed clock signals $CLK\_DR_0$ to $CLK\_DR_{N-1}$ in order to generate rising edge output data signals DAT_OR[0] to DAT_OR[N−1]. Similarly, the sampling circuitry 210, such as with the flip flops 214, may be configured to perform falling-edge sampling of each of the data signals DAT[0] to DAT[N−1] according to the rising edges of the falling edge delayed clock signals $CLK\_DF_0$ to $CLK\_DF_{N-1}$ in order to generate falling edge output data signals DAT_OF[0] to DAT_OF[N−1]. As shown in FIG. 2, the sampling circuitry 210 may send the rising edge and falling edge output data signals DAT_OR[0] to DAT[OR[N−1] and DAT_OF[0] to DAT_OF[N−1] to the core logic circuitry 112 for further processing.

Figure 3:
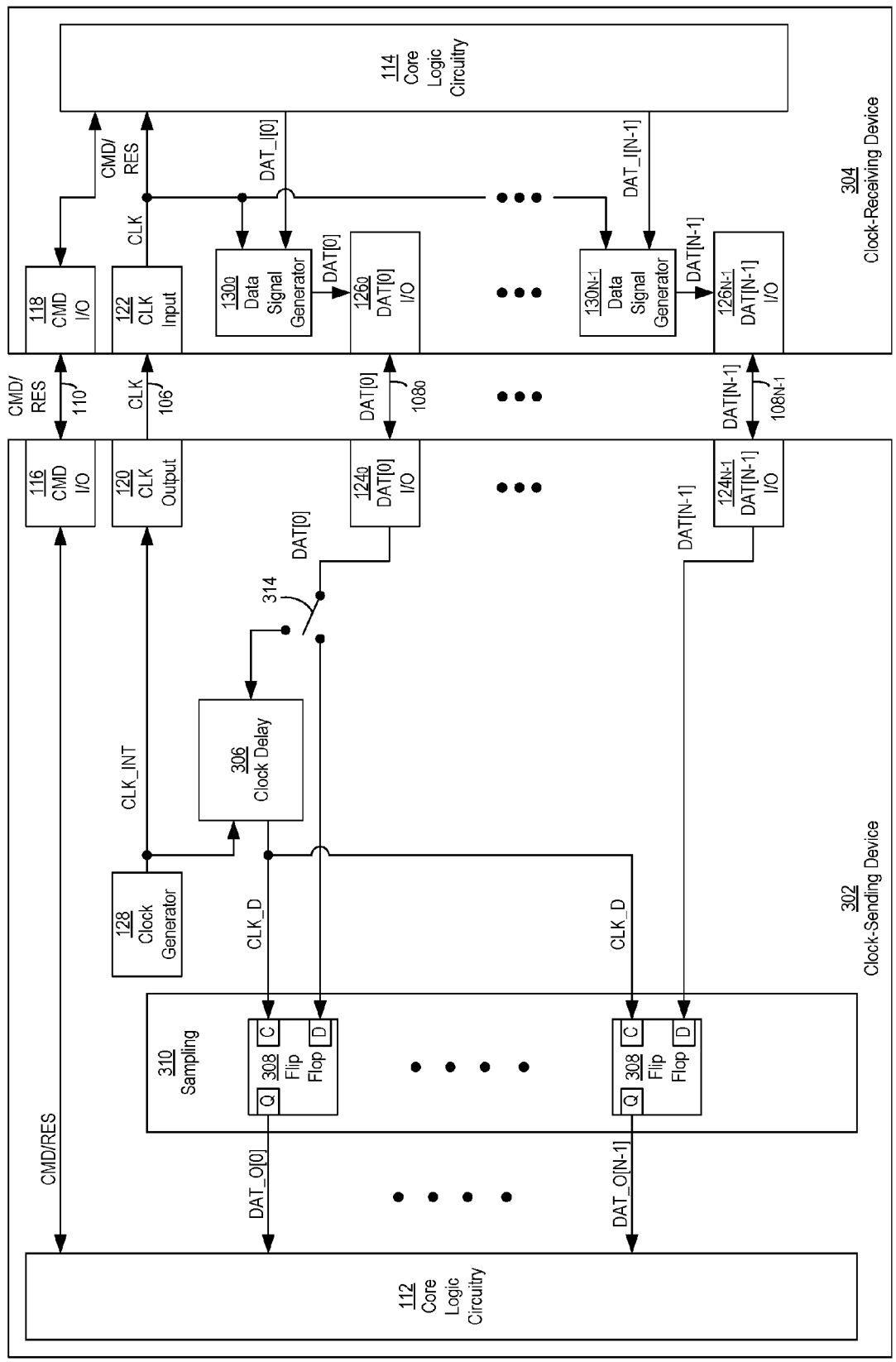
FIG. 3 is a block diagram of a third example non-source synchronous system.

In the example non-source-synchronous systems of FIGS. 1 and 2, the clock-sending devices 102, 202 each include clock delay circuitry that is configured to edge align the internal clock signal CLK_INT to each of the data signals DAT[0] to DAT[N−1] received on the communications bus. FIG. 3 shows another example non-source-synchronous system in which a clock-sending device 302 includes clock delay circuitry configured to edge align the internal clock signal CLK_INT to less than all of the data signals DAT[0] to DAT[N−1]. For example, in FIG. 3, the clock delay circuitry includes a clock delay circuit 306 that is configured to receive the internal clock signal CLK_INT and the first data signal DAT[0], and generate a delayed clock signal CLK_D. The clock delay circuit 306 may be configured to output the delayed clock signal CLK_D to a clock input of each flip flop circuit 308 of sampling circuitry 310 that is configured to perform sampling of the data signals DAT[0] to DAT[N−1]. In other words, the clock delay circuitry for the configuration of FIG. 3 may edge align the internal clock signal CLK_INT to only one of the data signals DAT[0] to DAT[N−1] in order to generate a common delayed clock signal CLK_D.

When the clock-sending device 302 is in the tuning phase, the core logic circuitry 112 may control a switching circuit 314 to connect the first data I/O circuit $124_0$ to the clock delay circuit 306 so that the clock delay circuit 306 receives the first data signal DAT[0]. When the clock-sending device 302 exits the tuning phase, the core logic circuitry 112 may control the switching circuit 314 to connect the first data I/O circuit $124_0$ to the sampling circuitry 310, and the common delayed clock signal CLK_D may be used by each of the flip flops 308 of the sampling circuitry 310 to perform sampling of data signals DAT[0] to DAT[N−1] received from a clock-receiving device 304.

Similar to the configuration of FIG. 1, the clock delay circuit 306 may be configured for SDR data transfer between the clock-sending device 302 and the clock-receiving device 304. That is, the clock delay circuit 306 may be configured to edge align the rising edge of the internal clock signal CLK_INT to either the rising edge or the falling edge of a single data signal (e.g., DAT[0]).

Figure 4:
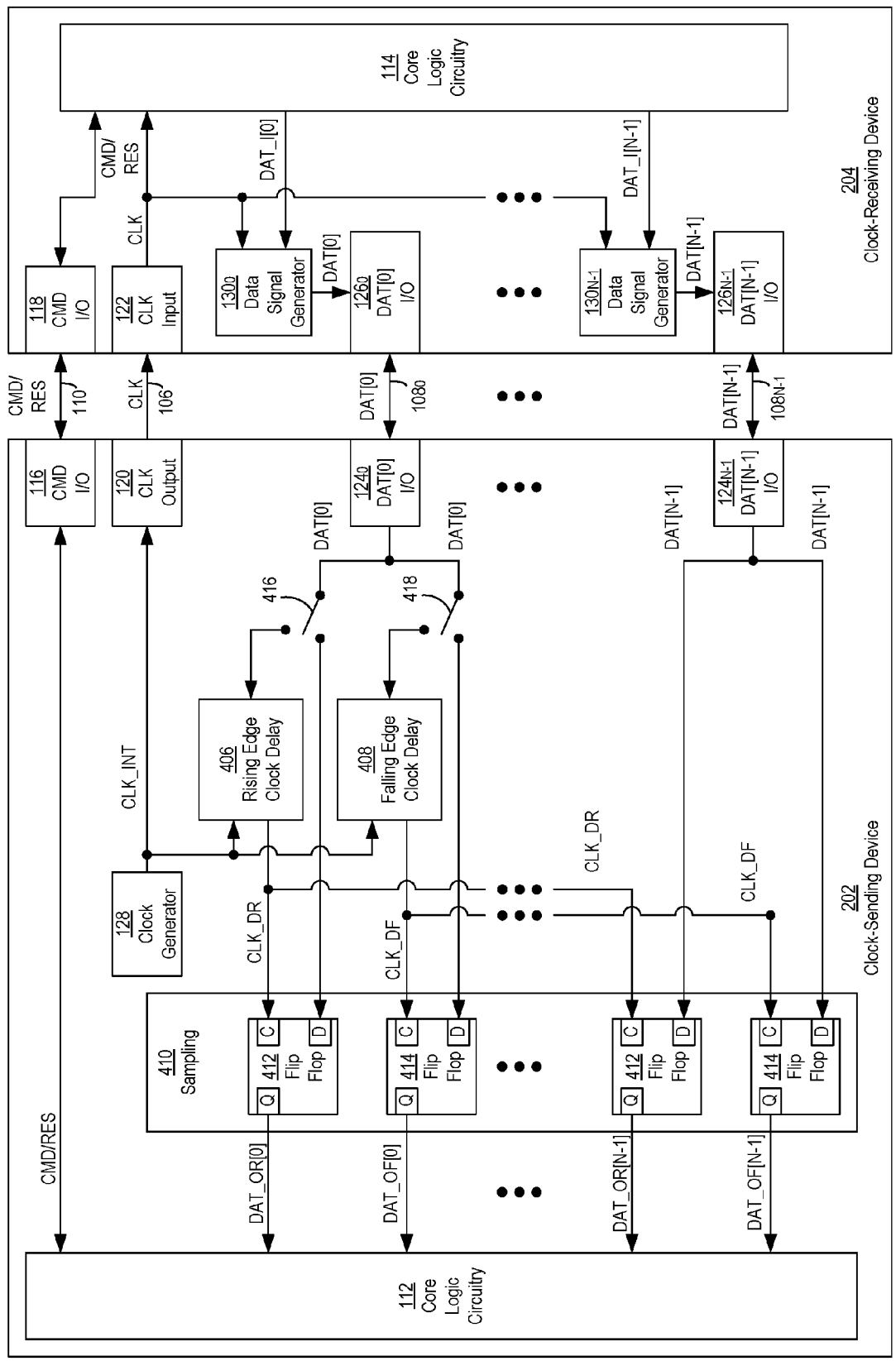
FIG. 4 is a block diagram of a fourth example non-source synchronous system.

FIG. 4 shows another example non-source-synchronous system that is similar to the system of FIG. 3 in that a single data signal is used for edge alignment. However, in contrast to the system of FIG. 3 and like the system of FIG. 2, the non-source-synchronous system of FIG. 4 is configured for DDR data transfer instead of SDR data transfer. In particular, clock delay circuitry of a clock-sending device 402 may include a rising edge clock delay circuit 406 and a falling edge clock delay circuit 408. Each of the rising edge clock delay circuit 406 and the falling edge delay circuit 408 may be configured to receive the internal clock signal CLK and the first data signal DAT[0]. The rising edge clock delay circuit 406 may be configured to edge align the rising edge of the internal clock signal CLK_INT to the rising edge of the first data signal DAT[0], and further delay the rising-edge-aligned clock signal a predetermined phase amount to generate a rising edge delayed clock signal CLK_DR. As shown in FIG. 4, the rising edge clock delay circuit 406 may output the rising edge delayed clock signal CLK_DR to sampling circuitry 410, and in particular flip flop circuits 412 that are configured to perform rising-edge sampling of the data signals DAT[0] to DAT[N−1] according to the rising edge of the rising edge delayed clock signal CLK_DR. In addition, the falling edge clock delay circuit 408 may be configured to edge align the rising edge of the internal clock signal CLK_INT to the falling edge of the first data signal DAT[0], and further delay the falling-edge-aligned clock signal a predetermined phase amount to generate a falling edge delayed clock signal CLK_DF. As shown in FIG. 4, the falling edge clock delay circuit 408 may output the falling edge delayed clock signal CLK_DF to sampling circuitry 410, and in particular flip flop circuits 414 that sample the data signals DAT[0] to DAT[N−1] according to the rising edges of the falling edge delayed clock signal CLK_DF. Accordingly, similar to the non-source-synchronous system of FIG. 3, the rising edge and falling edge clock delay circuits 406, 408 may provide common delayed clock signals CLK_DR, CLK_DF to the sampling circuitry 410 for rising-edge and falling-edge sampling of the data signals DAT[0] to DAT[N−1].

Additionally, the clock-sending device 402 may include a switching circuit 416 that is configured to alternatingly connect the first data I/O circuit $124_0$ to the rising edge clock delay circuit 406 and the sampling circuitry 410, and a switching circuit 418 that is configured to alternatingly connect the first data I/O circuit $124_0$ to the falling edge clock delay circuit 408 and the sampling circuitry 410. In the tuning phase, the core logic circuitry 112 may control the switching circuits 416, 418 so that the first data I/O circuit $124_0$ is connected to the rising edge and falling edge clock delay circuits 406, 408 and the first data signal DAT[0] received from a clock-receiving device 404 is routed to the rising edge and falling edge clock delay circuits 406, 408 for edge alignment.

When the clock-sending device 402 exits or is not in the tuning phase, the core logic circuitry 112 may control the switching circuits 416, 418 to connect the first data I/O circuit $124_0$ to the sampling circuitry 410, and the common rising and falling edge delayed clock signals CLK_DR, CLK_DF may be used by the flip flops 412, 414 of the sampling circuitry 410 to perform sampling of data signals DAT[0] to DAT[N−1] received from the clock-receiving device 404. In particular, flip flops 412 receiving the rising edge delayed clock signals CLK_DR may be configured to sample the data signals DAT[0] to DAT[N−1] on the rising edges of the rising edge delayed clock signal CLK_DR to generate rising edge output data signals DAT_OR[0] to DAT_OR[N−1]. Similarly, flip flops 414 receiving the falling edge delayed clock signal CLK_DF may be configured to sample the data signals DAT[0] to DAT[N−1] on the rising edges of the falling edge delayed clock signal CLK_DF to generate the falling edge output data signals DAT_OF[0] to DAT_OF[N−1]. As shown in FIG. 4, the sampling circuitry 410 may send the rising edge and falling edge output data signals DAT_OR[0] to DAT_OR[N−1] and DAT_OF[0] to DAT_OF[N−1] to the core logic circuitry 112 for further processing.

For the example configurations shown in FIGS. 3 and 4, the single data signal used for edge alignment is the first data signal DAT[0]. However, for other example configurations, any of the other data signals DAT[0] to DAT[N-1] may be used as the single data signal for edge alignment. Additionally, for some example configurations, the core logic circuitry 112 may be configured to select which of the data signals DAT[0] to DAT[N-1] to use for edge alignment. For example, although not shown in FIG. 3 or 4, each of the data I/O circuits $124_0$ to $124_{N-1}$ may be configured to output their respective data signals DAT[0] to DAT[N-1] to a multiplexer or other similar circuitry, and the core logic circuitry 112 may be configured to control the multiplexer to select which of the data signals DAT[0] to DAT[N-1] to send to the clock delay circuitry (e.g., the clock delay circuit 306 in FIG. 3 and the rising and falling edge clock delay circuits 406, 408 in FIG. 4) for edge alignment. Also, for other example configurations, more than one but less than all of the data signals DAT[0] to DAT[N-1] may be used for edge alignment to generate two or more delayed clock signals CLK_D (FIG. 3) or two or more pairs of rising edge and falling edge delayed clock signals CLK_DR, CLK_DF (FIG. 4), that are used to set the sample points of the sampling circuitry. Various configurations for utilizing one or more of the data signals DAT[0] to DAT[N-1] for edge alignment of the internal clock signal CLK_INT during a tuning phase of operation are possible.

Figure 5A:
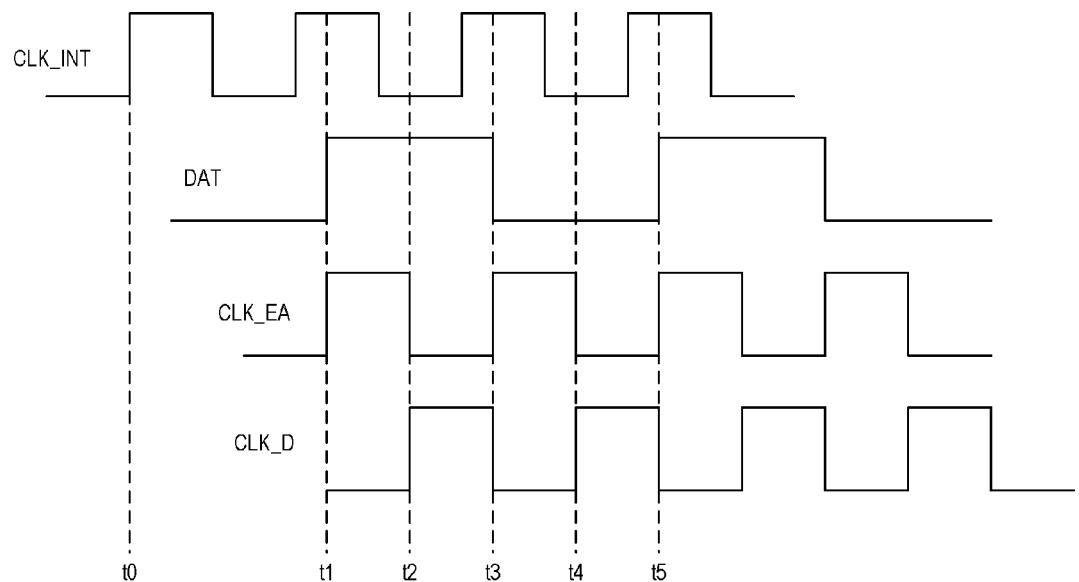
FIG. 5A is a timing diagram of clock and data signals generated with devices of the non-source synchronous systems of FIG. 1 or 3.

FIG. 5A shows a timing diagram of example waveforms of an internal clock signal CLK_INT, a data signal DAT, an edge-aligned clock signal CLK_EA, and a delayed clock signal CLK_D that may be generated with a clock-sending device and a clock-receiving device of a non-source-synchronous system during a tuning phase and/or to perform a tuning operation according to SDR, such as those previously described with reference to FIGS. 1 and 3. For example, the internal clock signal CLK_INT may be generated by the clock generator 128; the data signal DAT may represent any of the data signals DAT[0] to DAT[N-1] of FIG. 1 or 3, and the delayed clock signal CLK_D may represent any of the delayed clock signals CLK_$D_0$ to CLK_$D_{N-1}$ of FIG. 1 or the delayed clock signal CLK_D of FIG. 3. The edge-aligned clock-signal CLK_EA may be generated internally with clock delay circuitry (e.g., the clock delay circuits $136_0$ to $136_{N-1}$ of FIG. 1 or the clock delay circuit 306 of FIG. 3) as a result of edge-alignment.

As shown in FIG. 5A, for some example configurations, the pattern of the data signal DAT generated during a tuning operation is a clock pattern having a frequency that is half the frequency of the internal clock signal CLK_INT. As is generally the case for clock patterns, for each data cycle of the data signal DAT, a first portion of the data cycle is at a high voltage level, a second portion of the data cycle is at a low voltage level, and the data cycles are the same or repeat. In other configurations, the pattern of the data signal DAT generated during a tuning operation is not a clock pattern and/or generated at a frequency other than half the frequency of the internal clock signal CLK_INT. However, edge aligning the internal clock signal CLK_INT to a data signal having a clock pattern instead a non-clock-pattern may be advantageous.

Referring to the timing diagram, an initial time $t_0$ denotes when the start of an initial clock cycle of the internal clock signal CLK_INT is output by the clock generator 128 during a tuning operation, and time $t_1$ denotes when an initial data cycle of the data signal DAT that is generated with the initial clock cycle during the tuning operation is initially received with sampling circuitry of the clock-sending device (e.g., the clock sending devices 102, 302 of FIGS. 1,3). The time period extending from time $t_0$ to time $t_1$ may be the loop delay associated with the clock-sending device and the clock-receiving device.

In addition, as shown in FIG. 5A, the rising edges of the edge-aligned clock signal CLK_EA may be edge-aligned to the edges of the data signal DAT, although in other configurations, the falling edges of the edge-aligned clock signal CLK_EA may be edge aligned to the edges of the data signal DAT. The delayed clock signal CLK_D may, in turn, be delayed or phase-shifted 180 degrees relative to edge-aligned clock signal CLK_EA. The phase shift may be 180 degrees so that the rising edges of the delayed clock signal CLK_D occur generally in the middle of the duration of an associated data cycle that the voltage of the data signal DAT is at a high level or a low level. For example, as shown in FIG. 5A, by phase shifting the edge-aligned clock signal CLK_EA by 180 degrees, the rising edge of the delayed clock signal CLK_D occurring at time $t_2$ may occur in the middle of the time period extending from time $t_1$ to time $t_3$ that the voltage of the data signal DAT is at a high level. The time $t_2$ (and corresponding times for other cycles) may be the optimal or desired time at which to sample the data signal DAT over a time period in between a rising-edge transition and a falling-edge transition of the data signal DAT. Similarly, by phase-shifting the edge-aligned clock signal CLK_EA by 180 degrees, the rising edge of the delayed clock signal CLK_D occurring at time $t_4$ may occur in the middle of the time period extending from time $t_3$ to the time $t_5$ that the voltage of the data signal DAT is at a low level. The time $t_4$ (and corresponding times for other cycles) may be the optimal or desired time at which to sample the data signal DAT over a time period in between a falling-edge transition and a rising-edge transition of the data signal DAT.

The overall delaying of the internal clock signal CLK_INT to generate the delayed clock signal CLK_D may be performed by the delay circuitry of the clock-sending device by first edge aligning the rising edges of the internal clock signal CLK_INT to the edges of the data signal DAT to generate the edge-aligned clock signal CLK_EA, and then, when the edge aligning is complete, phase shifting or delaying the edge-aligned signal by 180 degrees to generate the delayed clock signal CLK_D.

Figure 5B:
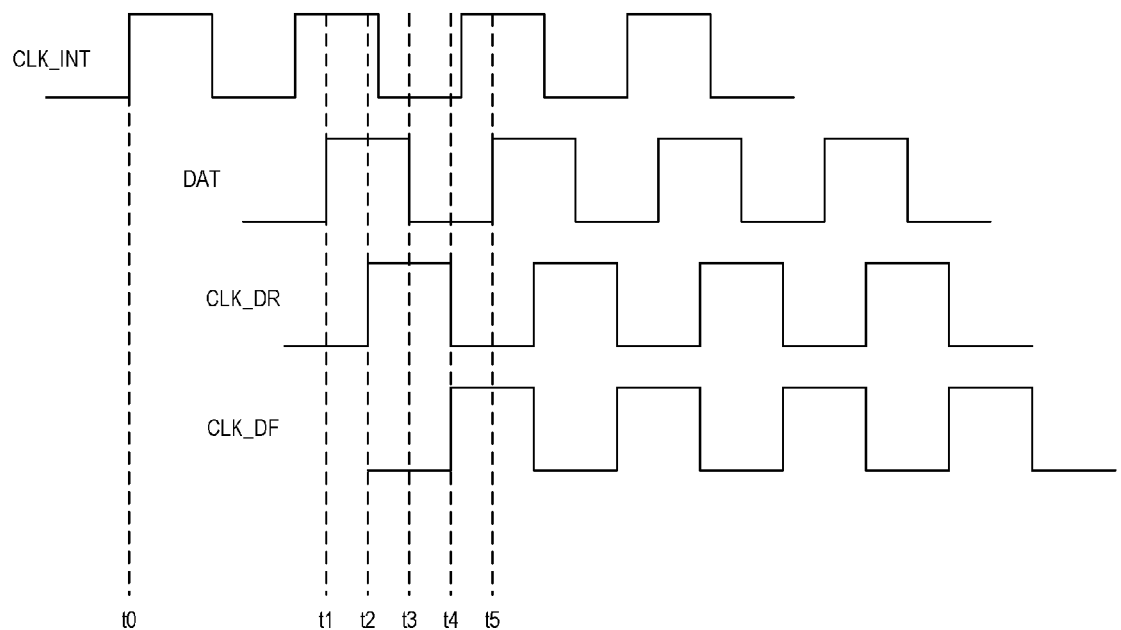
FIG. 5B is a timing diagram of clock and data signals generated with devices of the non-source synchronous systems of FIG. 2 or 4.

FIG. 5B shows a timing diagram of example waveforms of an internal clock signal CLK signal, a data signal DAT, a rising edge delayed clock signal CLK_DR, and a falling edge delayed clock signal CLK_DF that may be generated with a clock-sending device and a clock-receiving device of a non-source-synchronous system during a tuning phase and/or to perform a tuning operation, such as those previously described with reference to FIGS. 2 and 4. For example, the internal clock signal CLK_INT may be generated by the clock generator 128; the data signal DAT may represent any of the data signals DAT[0] to DAT[N-1] of FIGS. 2, 4, the rising edge delayed clock signal CLK_DR may represent any of the rising edge delayed clock signals CLK_$DR_0$ to CLK_$DR_{N-1}$ of FIG. 2 or the rising edge delayed clock signal CLK_DR of FIG. 4, and the falling edge delayed clock signal CLK_DF may represent any of the falling edge delayed clock signals CLK_$DF_0$ to CLK_$DF_{N-1}$ of FIG. 2 or the falling edge delayed clock signal CLK_DF of FIG. 4.

As shown in FIG. 5B, for some example configurations, the pattern of the data signal DAT generated during a tuning operation is a clock pattern having a clock frequency that matches the clock frequency of the internal clock signal CLK_INT. In other words, the data signal DAT may have the same pattern as the internal clock signal CLK_INT. In other configurations, the pattern of the data signal DAT generated during a tuning operation is not a clock pattern and/or generated at a frequency other than the frequency of the internal clock signal CLK_INT.

Referring to the timing diagram, an initial time $t_0$ denotes when the start of an initial clock cycle of the internal clock signal CLK_INT is output by the clock generator 128 during a tuning operation, and time $t_1$ denotes when an initial data cycle of the data signal DAT that is generated with the initial clock cycle during the tuning operation is initially received with sampling circuitry of the clock-sending device (e.g., the clock sending devices 202 or 402 of FIGS. 2, 4). The time period extending from time $t_0$ to time $t_1$ may be the loop delay associated with the clock-sending device and the clock-receiving device.

In addition, as shown in FIG. 5B, the rising edges of the rising edge delayed clock signal CLK_DR are delayed or phase-shifted 90 degrees relative to rising edges of the data signal DAT. The phase shift may be 90 degrees so that the rising edges of the rising edge delayed clock signal CLK_DR occur generally in the middle of the duration of an associated data cycle that the voltage of the data signal DAT is at a high level. For example, the rising edge delayed clock signal CLK_DR may be phase shifted 90 degrees so that the rising edge of the rising edge delayed clock signal CLK_DR occurs at time $t_2$, which is in the middle of the time period extending from time $t_1$ to time $t_3$ that the voltage of the data signal DAT is at a high level. The time $t_2$ (and corresponding times for other cycles) may be the optimal or desired time at which to sample the data signal DAT in response to the rising edge of the rising edge delayed clock signal CLK_DR.

The overall delaying of the internal clock signal CLK_INT to generate the rising edge delayed clock signal CLK_DR may be performed by the delay circuitry of the clock-sending device by first edge aligning the rising edges of the internal clock signal CLK_INT to the rising edges of the data signal DAT, and then, when the edge aligning is complete, phase shifting or delaying the edge-aligned signal by 90 degrees to generate the rising edge delayed clock signal CLK_DR.

Further, as shown in FIG. 5B, the rising edges of the falling edge delayed clock signal CLK_DF are delayed or phase-shifted 90 degrees relative to the falling edges of the data signal DAT. Similar to the phase shifting for the rising edge delayed clock signal CLK_DR, the amount of delay or time-shifting may be performed by the delay circuitry so that the rising edges of the falling edge delayed clock signal CLK_DF occur generally in the middle of the duration of an associated data cycle that the voltage of the data signal DAT is at a low level, such as at time $t_4$, which is the middle between times $t_3$ and $t_5$ that the data signal DAT is at a low level.

The overall delaying of the internal clock signal CLK_INT to generate the falling edge delayed clock signal CLK_DF may be performed by the delay circuitry of the clock-sending device by first edge aligning the rising edges of the internal clock signal CLK_INT to the falling edges of the data signal DAT, and then, when the edge aligning is complete, phase shifting or delaying the edge-aligned signal by 90 degrees to generate the falling edge delayed clock signal CLK_DF.

Figure 6:
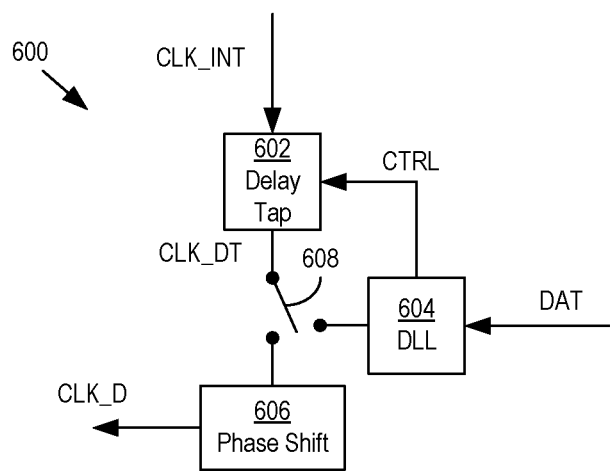
FIG. 6 is a block diagram of a clock delay circuit that may be used for the clock delay circuitry of the non-source synchronous systems of FIGS. 1-4.

FIG. 6 shows a block diagram of an example configuration of a clock delay circuit 600, which may be used as the configuration for any of the clock delay circuits 136$_0$ to 136$_{N-1}$, 206$_0$ to 206$_{N-1}$, 208$_0$ to 208$_{N-1}$, 306, 406, and 408 of FIGS. 1-4. The clock delay circuit 600 may be configured to generate a delayed clock signal CLK_D that is output to sampling circuitry of a clock-sending device. The delayed clock signal CLK_D may be representative of any of the delayed clock signals CLK_D$_0$ to CLK_D$_{N-1}$ in FIG. 1, the rising edge and falling edge delayed clock signals CLK_DR$_0$ to CLK_DR$_{N-1}$, CLK_DF$_0$ to CLK_DF$_{N-1}$ in FIG. 2, the delayed clock signal CLK_D in FIG. 3, or the rising and falling edge delayed clock signals CLK_DR, CLK_DF in FIG. 4 or in FIG. 5.

The clock delay circuit 600 may include a delay tap circuit 602, a delay locked loop (DLL) circuit 604, a phase shift circuit 606, and a switching circuit 608. As shown in FIG. 6, the delay tap circuit 602 may be configured to receive the internal clock signal CLK_INT. The delay tap circuit 602 may include a plurality of delay elements configured to delay the internal clock signal CLK_INT by a certain amount. That amount may vary and may depend on a control signal CTRL sent from the DLL circuit 604. The switching circuit 608 may alternatingly connect an output of the delay tap circuit 602 with either an input of the DLL circuit 604 or the input of the phase shift circuit 606. Control of the switching circuit 604 may be performed by the DLL circuit, the core logic circuitry, or some other circuitry of the clock-sending device.

When the clock delay circuit 600 performs edge alignment during the tuning phase, the switching circuit 608 may connect the output of the delay tap circuit 602 with the input of the DLL circuit 604. The control signal CTRL may have an initial value to configure the delay tap circuit 602 with an initial amount of delay. The delay tap circuit 602 may receive the internal clock signal CLK_INT and delay the internal clock signal CLK_INT by an amount corresponding to the control signal CTRL to generate a delay tap clock signal CLK_DT. The delay tap circuit 602 may provide the delay tap clock signal CLK_DT to the DLL circuit 604 via the switching circuit 608. As shown in FIG. 6, in addition to receiving the delay tap clock signal CLK_DT, the DLL circuit 604 may also receive a data signal DAT, which may be representative of any of the data signals DAT[0] to DAT[N-1] in FIGS. 1-4 or the data signal DAT in FIG. 5.

In response to receipt of the delay tap clock signal CLK_DT and the data signal DAT, the DLL circuit 604 may be configured to determine an amount of delay between the delay tap clock signal CLK_DT and the data signal DAT. The delay amount may be determined relative to the edges that the delay circuit 600 is configured to align. For example, if the clock delay circuit 600 is configured to perform rising edge alignment, then the DLL circuit 604 may be configured to determine a delay amount between the rising edge of the delay tap clock signal CLK_DT and the rising edge of the data signal DAT. Alternatively, if the clock delay circuit 600 is configured to perform falling edge alignment, then the DLL circuit 604 may be configured to determine the amount of delay between the delay tap clock signal CLK_DT and the data signal DAT with respect to the rising edge of the delay tap clock signal CLK_DT and the falling edge of the data signal DT. The control signal CTRL that the DLL circuit 604 outputs may then be indicative of the determined delay amount. The delay tap circuit 602 may then be configured to set and/or adjust the amount of delay by which it delays the internal clock signal CLK_INT based on the control signal CTRL. The delay tap circuit 602 and the DLL circuit 604 may operate in this circular manner and dynamically adjust the delay provided by the delay tap circuit 602 to delay the internal clock signal CLK_INT until the delay tap clock signal CLK_DT is edge aligned with the data signal DAT as desired, which may be indicated by the control signal CTRL. In some example configurations, the DLL circuit 604 may be configured to output the control signal CTRL to configure the delay tap circuit 602 in steps in order to determine the appropriate delay tap for the desired edge alignment.

When the delay tap clock signal CLK_DT is edge aligned with the data signal DAT as desired, the switching circuit 608 may be switched so that the output of the delay tap circuit 602 is connected to the input of the phase shift circuit 606, and the delay tap clock signal CLK_DT is provided to the input of the phase shift circuit 606. In response, the phase shift circuit 606 may be configured to delay the delay tap clock signal CLK_DT by a predetermined phase amount, such as 90 degrees for DDR or 180 degrees for SDR, to generate the delayed clock signal CLK_D that is output to the sampling circuitry of the clock-sending device.

When the delay clock circuit 600 exits or is not in the tuning phase, the switching circuit 608 may be configured to connect the output of the delay tap circuit 602 with the phase shift circuit 606. The internal clock signal CLK_INT may be provided to the delay tap circuit 602, which may delay internal clock signal CLK_INT by a desired amount corresponding to the loop delay such that the delay tap clock signal CLK_DT output from the delay tap circuit 602 is edge aligned with the data signal DAT. In this regard, the delay tap clock signal CLK_DT output by the delay tap circuit 602 may be considered an edge aligned clock signal. The corresponding delayed clock signal CLK_D output from the phase shift circuit 606 is provided to sampling circuitry, which samples the data signals DAT[0] to DAT[N-1] received from the clock-receiving device according to the rising edge of the delayed clock signal CLK_D.

Figure 7:
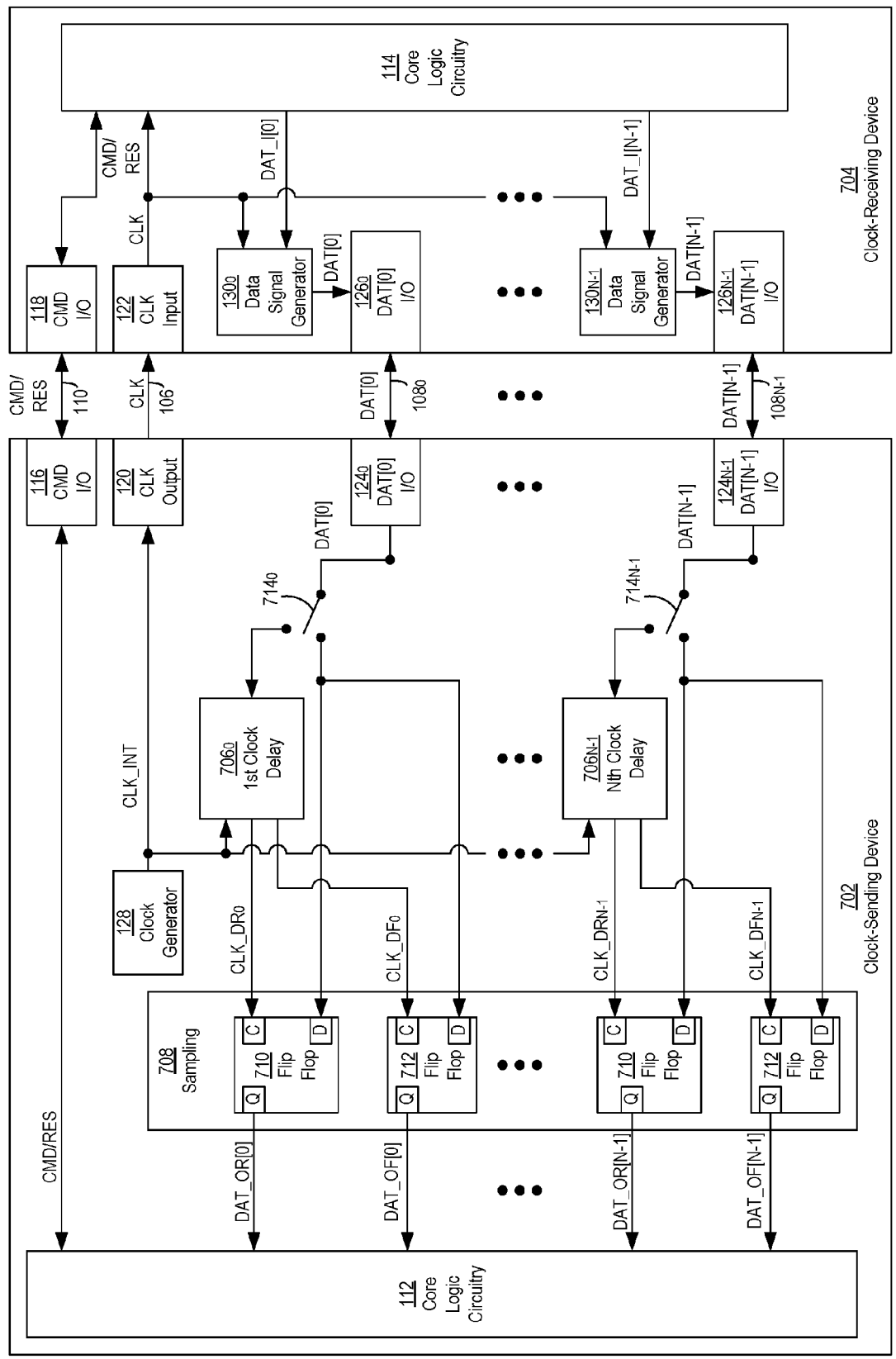
FIG. 7 is a block diagram of a fifth example non-source synchronous system.

FIG. 7 shows another example non-source-synchronous system that includes a clock-sending device 702 and a clock receiving device 704. Similar to the systems of FIGS. 2 and 4, the example system of FIG. 7 is configured for DDR data transfer. However, unlike the clock-sending devices 202, 402 of FIGS. 2 and 4, the clock-sending device 702 of FIG. 7 may not perform separate edge alignment for rising-edge sampling and falling-edge sampling. Instead, the clock-sending device 702 is configured to perform a single edge alignment operation for both the rising-edge sampling and the falling-edge sampling. That is, a clock delay circuit may edge align the internal clock signal CLK_INT to either the rising edge or the falling edge of one of the received data signals DAT[0] to DAT[N-1], and then the clock delay circuit may be configured to delay the edge-aligned clock signal by a first phase amount (e.g., 90 degrees) to generate a first rising edge delayed clock signal CLK_DR that is used for rising-edge sampling, and also delay the edge-aligned clock signal by a second phase amount (e.g., 270 degrees) to generate a second rising edge delayed clock signal CLK_DF that is used for falling-edge sampling.

The configuration shown in FIG. 7 may be similar to the configuration of FIG. 2 in that the delay circuitry of the clock-sending device 702 may be configured to edge align the internal clock signal CLK_INT to each of the data signals DAT[0] to DAT[N-1] in order to generate an N-number of rising edge delayed clock signals $CLK\_DR_0$ to $CLK\_DR_{N-1}$ and an N-number of falling edge delayed clock signals $CLK\_DF_0$ to $CLK\_DF_{N-1}$. In further detail, the clock delay circuitry of the clock-sending device 702 may include an N-number of clock delay circuits $706_0$ to $706_{N-1}$, each configured to receive the internal clock signal CLK_INT and a respective one of the data signals DAT[0] to DAT[N-1]. Each clock delay circuit $706_0$ to $706_{N-1}$ may be configured to edge align an edge of the internal clock signal CLK_INT with a rising edge or a falling edge of the data signal it is receiving. For example, a first clock delay circuit $706_0$ may be configured to edge align an edge of the internal clock signal CLK_INT to a rising edge or a falling edge of the first data signal DAT[0], and an Nth clock delay circuit $706_{N-1}$ may be configured to edge align an edge of the internal clock signal CLK_INT to a rising edge or a falling edge of the Nth data signal DAT[N-1]. Additionally, each of the clock delay circuits $706_0$ to $706_{N-1}$ may be configured to delay their respective edge-aligned clock signals by a first phase amount (e.g., 90 degrees) to generate a respective one of the rising edge delayed clock signals $CLK\_DR_0$ to $CLK\_DR_{N-1}$. Each of the clock delay circuits $706_0$ to $706_{N-1}$ may also be configured to delay their respective edge-aligned clock signals by a second phase amount (e.g., 270 degrees) to generate a respective one of the falling edge delayed clock signals $CLK\_DR_0$ to $CLK\_DR_{N-1}$.

Similar to the configuration of FIG. 2, sampling circuitry 708 of the clock-sending device 702 may be configured to perform rising-edge sampling in response to the rising edge delayed clock signals $CLK\_DR_0$ to $CLK\_DR_{N-1}$ and falling-edge sampling in response to the falling edge delayed clock signals $CLK\_DF_0$ to $CLK\_DF_{N-1}$. For example, the sampling circuitry may include flip flop circuits 710 configured to receive the rising edge delayed clock signals $CLK\_DR_0$ to $CLK\_DR_{N-1}$ and perform rising-edge sampling on the data signals DAT[0] to DAT[N-1] to generate rising edge output data signals DAT_OR[0] to DAT_OR[N-1]. The sampling circuitry 708 may further include flip flop circuits 712 configured to receive the falling edge delayed clock signals $CLK\_DF_0$ to $CLK\_DF_{N-1}$ and perform falling-edge sampling on the data signals DAT[0] to DAT[N-1] to generate falling edge output data signals DAT_OF[0] to DAT_OF[N-1]. As shown in FIG. 7, the core logic circuitry may receive the rising edge and falling edge delayed output data signals DAT_OR[0] to DAT_OR[N-1] and DAT_OF[0] to DAT_OF[N-1] for further processing.

In addition, the clock-sending device 702 may include switching circuits $714_0$ to $714_{N-1}$ configured in between the data I/O circuits $124_0$ to $124_{N-1}$ and the clock delay circuits $706_0$ to $706_{N-1}$. In the tuning phase, the core logic circuitry 112 may be configured to control the switching circuits $714_0$ to $714_{N-1}$ to connect each of the data I/O circuits $124_0$ to $124_{N-1}$ to respective clock delay circuits $706_0$ to $706_{N-1}$. When data signals DAT[0] to DAT[N-1] generated by the clock-receiving device 704 during the tuning phase are received by the data I/O circuits $124_0$ to $124_{N-1}$, the data I/O circuits $124_0$ to $124_{N-1}$ may route the data signals DAT[0] to DAT[N-1] to the clock delay circuits $706_0$ to $706_{N-1}$ for edge alignment. When tuning is completed and/or upon exiting the tuning phase, the core logic circuitry 112 may control the switching circuits $714_0$ to $714_{N-1}$ to connect the data I/O circuits $124_0$ to $124_{N-1}$ to the sampling circuitry 708. Outside of the tuning phase, the data I/O circuits $124_0$ to $124_{N-1}$ may receive data signals DAT[0] to DAT[N-1] from the clock-receiving device 704 and route them to the sampling circuitry 708 via the switching circuits $714_0$ to $714_{N-1}$. In response, the flip flops 710, 712 may perform rising-edge sampling and falling-edge sampling on the data signals DAT[0] to DAT[N-1] according to the rising edges of the rising edge delayed clock signals $CLK\_DR_0$ to $CLK\_DR_{N-1}$ and the rising edges of the falling edge delayed clock signals $CLK\_DF_0$ to $CLK\_DF_{N-1}$, respectively.

Figure 8:
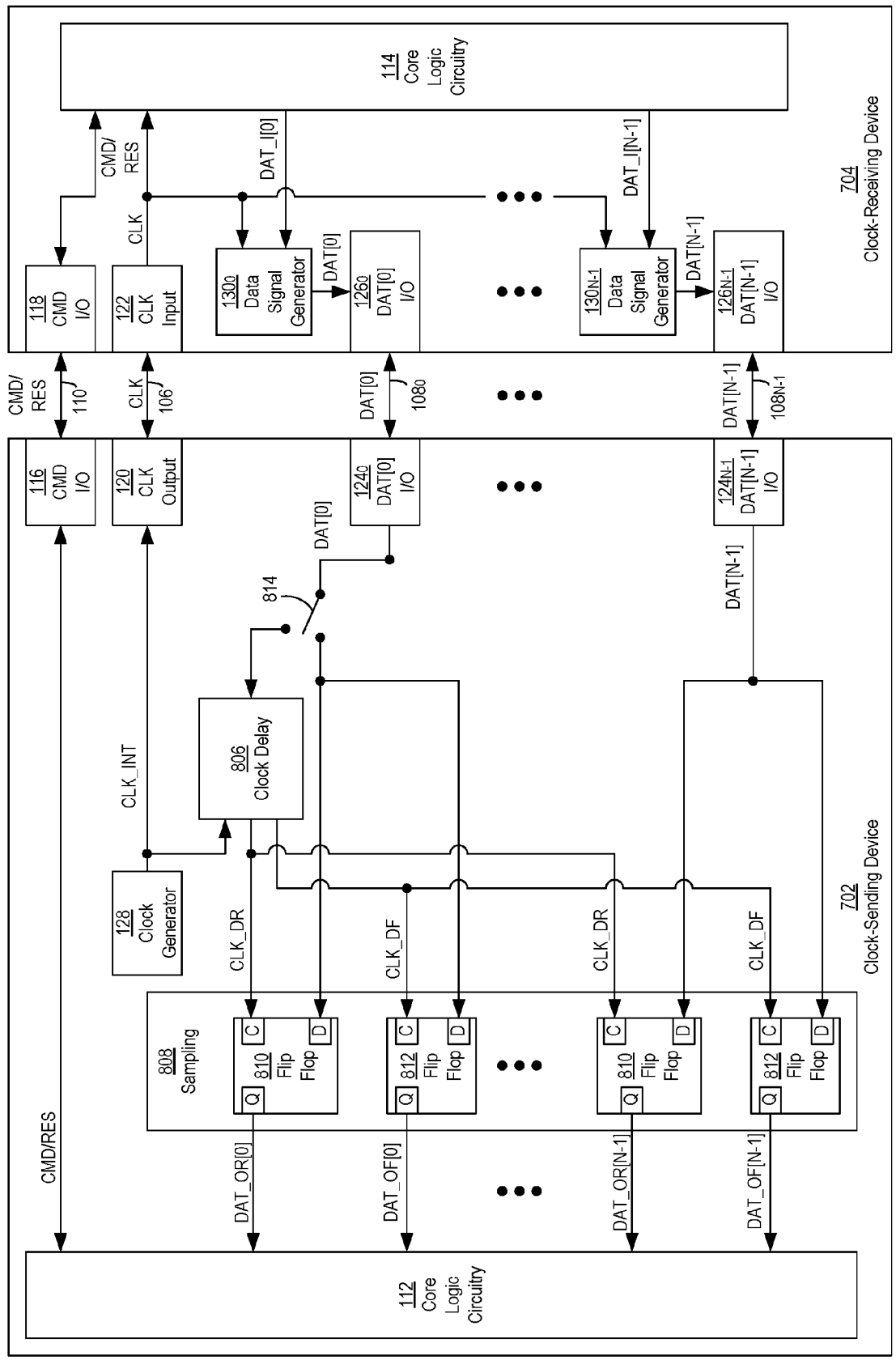
FIG. 8 is a block diagram of a sixth example non-source synchronous system.

FIG. 8 shows another example non-source synchronous system that includes a clock-sending device 802 and a clock-receiving device 804. The configuration of the tuning system of the clock-sending device 802 of FIG. 8 may be similar to that of the tuning system of FIG. 7 in that the delay circuitry of the clock-sending device 802 may be configured to perform a single edge alignment operation to generate both a rising edge delayed clock signal CLK_DR used for rising-edge sampling and a falling edge delayed clock signal CLK_DF used for falling-edge sampling by sampling circuitry 808. However, similar to the configuration of FIG. 4, a single data signal is used for edge alignment, and a common rising edge delayed clock signal CLK_DR is used by flip flops 810 to perform rising-edge sampling on the data signals DAT[0] to DAT[N-1] to generate rising edge output data signals DAT_OR[0] to DAT_OR[N-1], and a common falling edge delayed clock signal CLK_DF is used by flip flops 812 to perform falling-edge sampling on the data signals DAT[0] to DAT[N-1] to generate falling edge output data signals DAT_OF[0] to DAT_OF[N-1].

In addition, the clock-sending device 802 may include a switching circuit 814 configured in between the first data I/O circuit 124$_0$ and a clock delay circuit 806. In the tuning phase and/or when the core logic circuitry 112 determines to perform a tuning operation, the core logic circuitry 112 may control the switching circuit 814 to connect the first data I/O circuit 124$_0$ to the clock delay circuit 806. When the first data I/O circuit 124$_0$ receives the first data signal DAT[0] generated by the clock-receiving device 804 during the tuning phase, the data I/O circuit 124$_0$ may route the first data signal DAT[0] to the clock delay circuit 806 via the switch 814. The clock delay circuit 806 may edge align an edge of the internal clock signal CLK_INT to a rising edge or a falling edge of the first data signal DAT[0] to generate an edge aligned signal. In addition, the clock delay circuit 806 may delay the edge-aligned clock signal by a first phase amount (e.g., 90 degrees) to generate the rising edge delayed clock signal CLK_DR, and delay the edge-aligned clock signal by a second phase amount (e.g., 270 degrees) to generate the falling edge delayed clock signal CLK_DF.

After the tuning operation is complete and/or outside of the tuning phase, the core logic circuitry 112 may control the switching circuit 814 so that the first data I/O circuit 124$_0$ is connected to the sampling circuitry 808. Upon receiving the data signals DAT[0] to DAT[N-1] from the clock-receiving device 804, the flip flops 810 may perform rising-edge sampling on the data signals DAT[0] to DAT[N-1] according to the rising edges of the rising edge delayed clock signals CLK_DR to generate the rising edge output data signals DAT_OR[0] to DAT_OR[N-1], and the flip flops 812 may perform falling-edge sampling on the data signals DAT[0] to DAT[N-1] according to the rising edges of the falling edge delayed clock signals CLK_DF to generate the falling edge output data signals DAT_OF[0] to DAT_OF[N-1].

For the example configuration shown in FIG. 8, the single data signal used for edge alignment is the first data signal DAT[0]. However, for other example configurations, any of the other data signals DAT[0] to DAT[N-1] may be used as the single data signal for edge alignment. Additionally, for some example configurations, the core logic circuitry 112 may be configured to select which of the data signals DAT[0] to DAT[N-1] to use for edge alignment. For example, although not shown in FIG. 8, each of the data I/O circuits 124$_0$ to 124$_{N-1}$ may be configured to output their respective data signals DAT[0] to DAT[N-1] to a multiplexer or other similar circuitry, and the core logic circuitry 112 may be configured to control the multiplexer to select which of the data signals DAT[0] to DAT[N-1] to send to the clock delay circuit 806 for edge alignment. Also, for other example configurations, more than one but less than all of the data signals DAT[0] to DAT[N-1] may be used for edge alignment to generate two or more pairs of rising edge and falling edge delayed clock signals CLK_DR, CLK_DF that are used to set the sample points of the sampling circuitry 808. Various configurations for utilizing one or more of the data signals DAT[0] to DAT[N-1] for edge alignment of the internal clock signal CLK_INT during a tuning phase of operation are possible.

Figure 9:
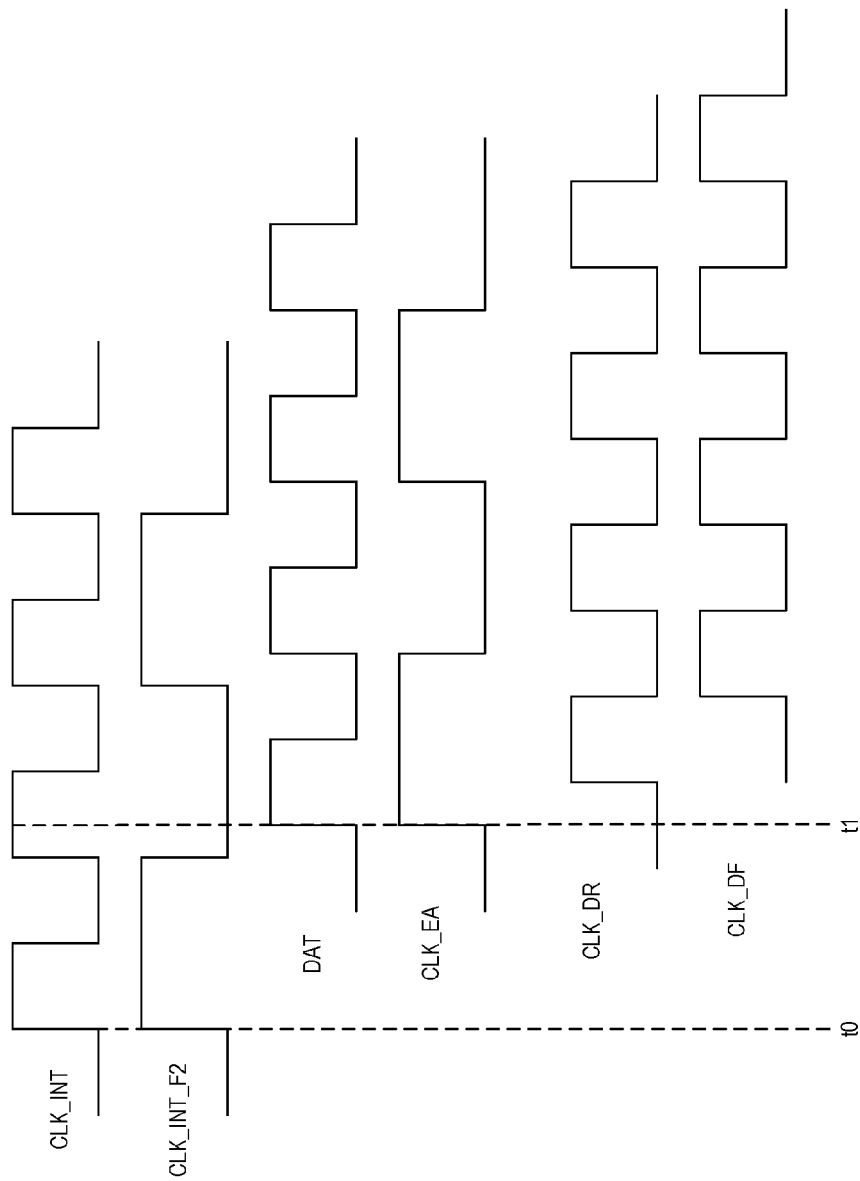
FIG. 9 is a timing diagram of clock and data signals generated with the devices of the non-source synchronous systems of FIGS. 7 and 8.

FIG. 9 shows a timing diagram of example waveforms of the internal clock signal CLK_INT, a second internal clock signal CLK_INT_F2 having half the frequency of the internal clock signal CLK_INT, a data signal DAT, an edge-aligned clock signal CLK_EA, a rising edge delayed clock signal CLK_DR, and a falling edge delayed clock signal CLK_DF, each of which may be generated during a tuning phase to perform a tuning operation with the clock-sending devices 702, 802 and the clock-receiving devices 704, 804 of the non-source-synchronous systems described with reference to FIGS. 7 and 8. For example, the internal clock signal CLK_INT may be generated by the clock generator 128; the data signal DAT may represent any of the data signals DAT[0] to DAT[N-1] of FIGS. 7 and 8, the rising edge delayed clock signal CLK_DR may represent any of the rising edge delayed clock signals CLK_DR$_0$ to CLK_DR$_{N-1}$ of FIG. 7 or the rising edge delayed clock signal CLK_DR of FIG. 8, and the falling edge delayed clock signal CLK_DF may represent any of the falling edge delayed clock signals CLK_DF$_0$ to CLK_DF$_{N-1}$ of FIG. 7 or the falling edge delayed clock signal CLK_DF of FIG. 8. Additionally, the second internal clock signal CLK_INT_F2 and the edge-aligned clock signal CLK_EA may represent signals generated with internal components of the clock delay circuits 706$_0$ to 706$_{N-1}$ of FIG. 7 or the clock delay circuit 806 of FIG. 8.

Similar to the timing diagram of FIG. 5, an initial time t$_0$ denotes when the start of an initial clock cycle of the internal clock signal CLK_INT is output by the clock generator 128, and time t$_1$ denotes when an initial data cycle of the data signal DAT that is generated with the initial clock cycle is initially received with sampling circuitry of the clock-sending device (e.g., the clock-sending devices 702, 802 of FIGS. 7 and 8). The time period extending from time t$_0$ to time t$_1$ may be the loop delay associated with the clock-sending device and the clock-receiving device.

For the tuning configurations in FIGS. 7 and 8, since the internal clock signal CLK_INT is edge aligned to only one of the edges of the data signal DAT, then the internal clock signal CLK_INT may first be frequency-divided in half so that only one transition of the second internal clock signal CLK_INT_F2 occurs during a period of the internal clock signal CLK_INT. The second internal clock signal CLK_INT_F2 may then be delayed so that the edges of the second internal clock signal CLK_INT_F2 are aligned with the rising edges of the data signal DAT to generate the edge-aligned clock signal CLK_EA. The edge-aligned clock signal CLK_EA may then be delayed a first phase amount of 90 degrees to generate the rising edge delayed clock signal CLK_DR, and a second phase amount of 270 degrees to generate the falling edge delayed clock signal CLK_DF. The edge-aligned clock signal CLK_EA may be delayed by the first and second amounts so that the rising edges of the rising edge delayed clock signal CLK_DR occur at optimal (middle) points within the durations that the voltage of the data signal DAT is at a high level, and so that the rising edges of the falling edge delayed clock signal CLK_DR occur at an optimal (middle) points within the durations that the voltage of the data signal DAT is at a low level. Additionally, when the edge alignment is complete, the second internal clock signal CLK_INT_F2 may no longer be needed to perform edge alignment, and so upon exiting the tuning phase, the internal clock signal CLK_INT, and not the second internal clock signal CLK_INT_F2, may be initially delayed and then phase shifted to generate the rising edge and falling edge delayed clock signals CLK_DR, CLK_DF. FIG. 9 shows the rising edge and falling edge delayed clock signals CLK_DR, CLK_DF each having the same clock frequency as the internal clock signal CLK_INT.

Figure 10:
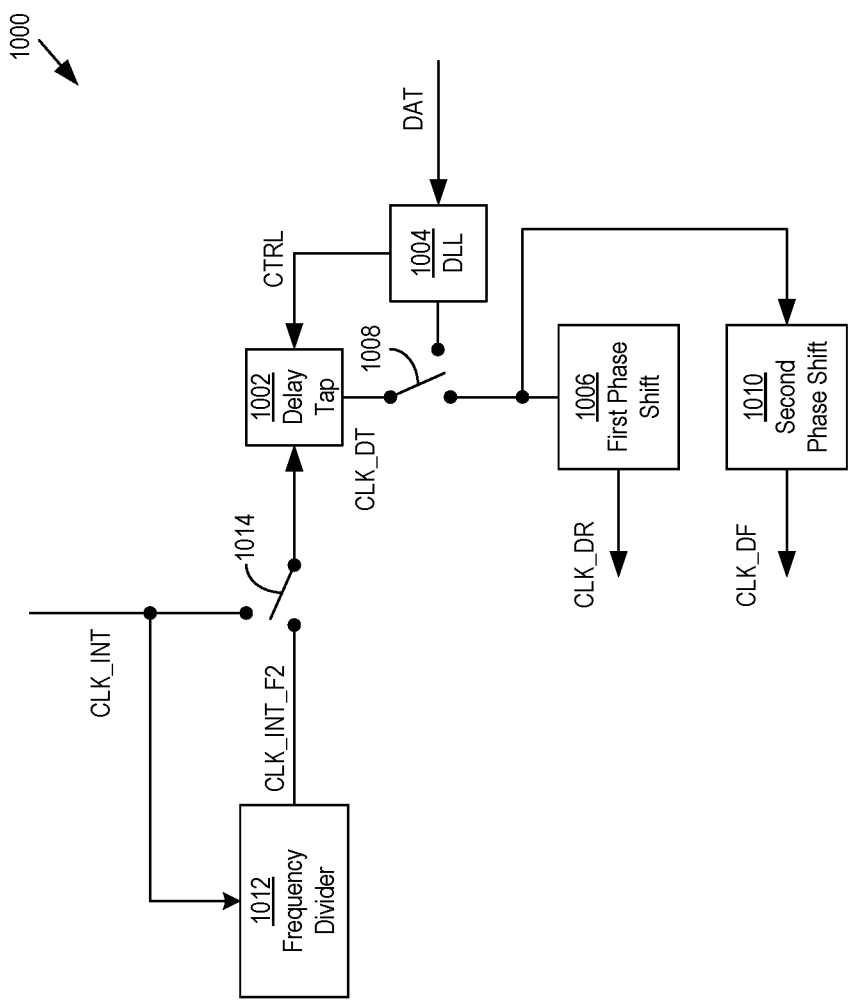
FIG. 10 is a block diagram of a clock delay circuit that may be used for the clock delay circuitry of the non-source synchronous systems of FIGS. 7 and 8.

FIG. 10 shows a block diagram of an example configuration of a clock delay circuit 1000, which may be used as the configuration for any of the clock delay circuits $706_0$ to $706_{N-1}$ of FIG. 7 or the clock delay circuit 806 of FIG. 8. The clock delay circuit 1000 may be configured to generate a rising edge delayed clock signal CLK_DR and a falling edge delayed clock signal CLK_DF in response to receipt of the internal clock signal CLK_INT and a data signal DAT. The rising edge delayed clock signal CLK_DR may be representative of any of the rising edge delayed clock signals $CLK\_DR_0$ to $CLK\_DR_{N-1}$ in FIG. 7 or the rising edge delayed clock signal CLK_DR in FIG. 8 or in FIG. 9, and the falling edge delayed clock signal CLK_DF may be representative of any of the falling edge delayed clock signals $CLK\_DF_0$ to $CLK\_DF_{N-1}$ in FIG. 7 of the falling edge delayed clock signal CLK_DF in FIG. 8 or in FIG. 9.

Similar to the clock delay circuit 600 of FIG. 6, the clock delay circuit 1000 may include a delay tap circuit 1002 and a DLL circuit 1004. In addition, as shown in FIG. 10, the clock delay circuit 1000 may include a first phase shift circuit 1006 that is configured to generate the rising edge delayed clock signal CLK_DR, and a second phase shift circuit 1010 that is configured to generate the falling edge delayed clock signal CLK_DF. In addition, the clock delay circuit 1000 may include a first switching circuit 1008 that is configured to alternatingly connect the output of the delay tap circuit 1002 to the input of the DLL circuit 1004 and the inputs of the first and second phase shift circuits 1006, 1010. The clock delay circuit 1000 may also include a frequency divider circuit 1012 that is configured to receive the internal clock signal CLK_INT and divide the frequency of the internal clock signal CLK_INT in half (f/2) to generate a second internal clock signal CLK_INT_F2, which may be representative of the second internal clock signal CLK_INT_F2 in FIG. 9. The clock delay circuit 1000 may further include a second switching circuit 1014 configured to alternatingly connect the input of the delay tap circuit 1002 to the output of the clock generator 128 to receive the internal clock signal CLK_INT or the output of the frequency divider circuit 1012 to receive the second internal clock signal CLK_INT_F2. The first and second switching circuits 1008, 1014 may each be controlled by the DLL circuit 1004, the core logic circuitry 112, or some other control circuitry of the clock-sending device.

During the tuning phase, the first switching circuit 1008 may be configured to connect the output of the delay tap circuit 1002 to the input of the DLL circuit 1004, and the second switching circuit 1014 may be configured to connect the output of the frequency divider circuit 1012 to the input of the delay tap circuit 1002. Accordingly, the internal clock signal CLK_INT may be provided to the frequency divider circuit 1012, and the frequency divider circuit 1012 may divide the frequency of the internal clock signal CLK_INT to generate the second internal clock signal CLK_INT_F2. The delay tap circuit 1002 may receive the second internal clock signal CLK_INT_F2 and delay the second internal clock signal CLK_INT_F2 by a certain amount to generate a delay tap clock signal CLK_DT. The amount that the second internal clock signal CLK_INT_F2 may be delayed may depend on a control signal CTRL received from the DLL circuit 1004. The delay tap circuit 1002 may provide the delay tap clock signal CLK_DT to the DLL circuit 1004 via the switching circuit 1008. As shown in FIG. 10, in addition to receiving the delay tap clock signal CLK_DT, the DLL circuit 1004 may also receive a data signal DAT, which may be representative of any of the data signals DAT[0] to DAT[N-1] in FIG. 7 or 8 or the data signal DAT in FIG. 9.

In response to receipt of the delay tap clock signal CLK_DT and the data signal DAT, the DLL circuit 1004 may be configured to determine an amount of delay between the delay tap clock signal CLK_DT and the data signal DAT. The delay amount may be determined relative to the rising edges of the data signal DAT and the second internal clock signal CLK_INT_F2. The control signal CTRL that the DLL circuit 1004 outputs may be indicative of the determined delay amount. The delay tap circuit 1002 may then be configured to set and/or adjust the amount of delay by which it delays the second internal clock signal CLK_INT_F2 based on the control signal CTRL. The delay tap circuit 1002 and the DLL circuit 1004 may operate in this circular manner until the delay tap clock signal CLK_DT is edge aligned with the data signal DAT as desired, which may be indicated by the control signal CTRL. Upon being edge aligned, the delay tap clock signal CLK_DT may have the waveform of the edge-aligned clock signal CLK_EA in FIG. 9.

When the delay tap clock signal CLK_DT is edge aligned with the data signal DAT as desired, the first switching circuit 1008 may be switched so that the output of the delay tap circuit 1002 is connected to the input of the first phase shift circuit 1008 and to the input of the second phase shift circuit 1010, and the delay tap clock signal CLK_DT is provided to the inputs of each of the first and second phase shift circuits 1006, 1010. In response, the first phase shift circuit 1006 may be configured to delay the delay tap clock signal CLK_DT by a first predetermined phase amount, such as 90 degrees, to generate the rising edge delayed clock signal CLK_DR, and the second phase shift circuit 1010 may be configured to delay the delay tap clock signal CLK_DT by a second predetermined phase amount, such as 270 degrees, to generate the falling edge delayed clock signal CLK_DF.

When the delay clock circuit 1000 exits or is not in the tuning phase, the first switching circuit 1008 may be configured to connect the output of the delay tap circuit 1002 with the first and second phase shift circuits 1006, 1010, and the second switching circuit 1014 may be configured to connect the output of the clock generator 128 to the delay tap circuit 1002 (i.e., disconnect the frequency divider 1012 from the delay tap 1002). The internal clock signal CLK_INT may be provided to the delay tap circuit 1002, which may delay the internal clock signal CLK_INT by a desired amount corresponding to the loop delay. The corresponding rising edge and falling edge delayed clock signals CLK_DR, CLK_DF output from the first and second phase shift circuits 1006, 1010 are provided to the sampling circuitry, which samples the data signals DAT[0] to DAT[N-1] received from the clock-receiving device according to the rising edges of the rising edge and falling edge delayed clock signals CLK_DR, CLK_DF.

In addition or alternatively to the non-source-synchronous systems of FIGS. 7 and 8, the non-source-synchronous systems of FIGS. 1 and 3 that communicate according to SDR instead of DDR may use the clock-delay circuit 1000 to generate their respective delayed clock signals, such as the delayed clock signals $CLK\_D_0$ to $CLK\_D_{N-1}$ in FIG. 1 or the delayed clock signal CLK_D in FIG. 3. To do so, the clock delay circuit 1000 may perform edge-alignment in the same way as previously described for DDR communication, but only one the phase shift circuits (e.g., only the first phase shift circuit 1006) may be used to generate the delayed clock signal. Once the delay tap clock signal CLK_DT is edge aligned to the data signal DAT, the first phase shift circuit 1006 may phase shift the edge-aligned clock signal by 180 degrees to generate the delayed clock signal.

Referring to any of the non-source-synchronous systems of FIGS. 1-4, 7, and 8, the core logic circuitry 112 of the clock-sending device may be configured to determine to enter into the tuning phase to perform the tuning operation during or automatically following an initialization phase or sequence, during which the clock-sending device may begin supplying one or more power supply voltages to the clock-receiving device and the clock-sending and clock-receiving devices may negotiate the voltage domain at which they are communicating over the communications bus. In addition or alternatively, the core logic circuitry 112 may be configured to enter into the tuning phase to perform the tuning operation when in a normal mode of operation and/or in a data transfer mode, during which the clock-sending device may receive data it has requested from the clock-receiving device, such as data the clock-receiving device is storing in its memory. For example, upon receiving data from the clock-receiving device, the core logic circuitry 112 may identify one or more errors in the received data, such as cyclic redundancy check (CRC) errors. The identification of one or more errors in the received data may trigger the core logic circuitry 112 to enter into the tuning phase and perform a tuning operation. In addition or alternatively, the core logic circuitry 112 may be configured to enter into the tuning phase to perform the tuning operation upon entering an idle phase or state. That is, the determination to enter into an idle phase or state and/or the entrance into the idle phase or state may trigger the core logic circuitry 112 to enter into the tuning phase and perform a tuning operation. In addition or alternatively, the core logic circuitry 112 may be configured to enter into the tuning phase to perform the tuning operation when the core logic circuitry 112 determines to change the frequency of the internal clock signal CLK_INT.

Additionally, when the clock-receiving device is configured in the tuning phase, the clock-receiving device may be configured to send a data signal on only one of the data lines $108_0$ to $108_{N-1}$, on more than one but less than all of the data lines $108_0$ to $108_{N-1}$, or on all of the data lines $108_0$ to $108_{N-1}$. In some example configurations, the clock-receiving device may be configured to send more data signals to the clock-sending device during the tuning phase than the clock-sending device may be configured to use to perform edge alignment. For example, the clock-receiving device may be configured to send data signals on all of the data lines $108_0$ to $108_{N-1}$ and the clock-sending device may be configured to select which of the data signals to use.

In addition or alternatively, as previously described, for some example configurations, the clock-receiving device may be configured to generate the data signals during the tuning phase to have a clock pattern. When the clock-sending device and the clock-receiving device are configured to communicate according to SDR, the data signal generators $130_0$ to $130_{N-1}$ of the clock-receiving device may be configured to generate the clock-patterned data signals to be at alternating logic levels over consecutive clock cycles. In other words, a frequency of a clock-patterned data signal sent for SDR tuning may be half the frequency of the host clock signal CLK received from the clock-sending device. Alternatively, when the clock-sending device and the clock-receiving device are configured to communicate according to DDR, the data signal generators $130_0$ to $130_{N-1}$ of the clock-receiving device may be configured to generate the clock-patterned data signals at logic high levels on every rising edge of the host clock signal CLK and at logic low levels on every falling edge of the host clock signal CLK, or alternatively at logic low levels on every rising edge of the host clock signal CLK and at logic high levels on every falling edge of the host clock signal CLK. In other words, a frequency of a clock-patterned data signal sent for DDR tuning may have the same frequency as the host clock signal CLK.

In addition or alternatively, for some example configurations, the clock-receiving device may be configured to generate the data signals during the tuning phase according to a particular or predetermined format. For example, a single data signal that the clock-receiving device sends may include a first portion corresponding to a start indication (e.g., a start bit), a second portion corresponding to the data pattern that the clock-sending device uses for edge alignment, a third portion corresponding to CRC bits, and a fourth portion corresponding to an end indication (e.g., an end bit). Other formats may be possible. Additionally, the number of transitions of the second portion corresponding to the data pattern may correspond to a predetermined bit size, such as 512 bytes for example.

In addition, the clock-receiving device may be configured to send multiple data signals on the same data line in various ways. In one example configuration, the clock-sending device may send a tuning command on the command line 110 that indicates to the clock-receiving device to enter into the tuning phase. The clock-receiving device may respond to the tuning command by sending a response on the clock line back to the clock-sending device, indicating that the clock-receiving device will enter or has entered into the tuning phase. Subsequently the clock-receiving device may send a single data signal on one or more of the data lines $108_0$ to $108_{N-1}$. For some example configurations, the clock-receiving device may not send another or additional data signals on the data lines $108_0$ to $108_{N-1}$ unless it receives another tuning command from the clock-sending device. For other example configurations, the clock-receiving device may be configured to send a predetermined number of data signals on one or more of the data lines $108_0$ to $108_{N-1}$ or continuously send data signals on or more of the data lines $108_0$ to $108_{N-1}$ until the clock-sending device receives a stop command from the clock-sending device. Various configurations or schemes for configuring the clock-sending and clock-receiving devices to communicate data signals used for edge alignment during the tuning phase may be possible.

For some example implementations, the clock-receiving device may be a Secure Digital (SD) memory device, system, apparatus, or product, such as a SD or microSD device (collectively referred to herein as SD device), that is configured in accordance a SD specification or protocol. The clock-sending device may be a host device, system, apparatus, or product that is configured to be connected to the SD device and communicate with the SD device according to the SD specification or protocol. In some example configurations, the host device may transmit the host clock signal CLK at 200 Megahertz (MHz). For this clock frequency, and by being able to perform tuning for DDR using the delay circuitry of the present description, the host device and the SD device may be configured to communicate at a data rate of 200 Megabytes per second (MB/s) over a communications bus that includes 4 data lines, or alternatively a data rate of 400 MB/s over a communications bus that includes 8 data lines.

In accordance with the SD specification or protocol, the host device may be configured to send a data-line usage command on the command line 110 that indicates how many data lines that the host device and the SD device are to use to communicate data signals. When the SD device is initially connected to the host device and they perform initialization, the host device and the SD device may use a single data line (referred to as 1-bit mode). After the initialization sequence, the SD device may communicate the data-line usage command (referred to as ACMD6 under the SD specification) to indicate to the SD card to switch to a higher number of data lines to use. For SD devices that utilize 8 data lines, in some example configurations, the host device may transmit a first data-line usage command ACMD6 to indicate to the SD device to switch from using one data line (1-bit mode) to four data lines (4-bit mode), and then a second data-line usage command ACMD6 to indicate to the SD device to switch from using four data lines (4-bit mode) to eight data lines (8-bit mode). In other example configurations, the host device may transmit a single data-line usage command ACMD6 to indicate to the SD device to switch from using one data line (1-bit mode) directly to using eight data lines (8-bit mode). Subsequently, after communicating the one or more data-line usage commands (ACMD6), the host device and the SD device may enter into the tuning phase to perform tuning.

In addition, when the host device determines to enter into the tuning phase, the host device may send a tuning command (referred to as CMD19 under the SD specification) on the command line 110 to indicate to the SD device to enter into the tuning phase. In some example configurations, the tuning command may indicate to the SD device whether to generate the data signals in the tuning phase to have a clock pattern or a data pattern other than a clock pattern. Additionally, in some example configurations, the tuning command (CMD19) may indicate to the SD card whether to generate the data signals according to SDR or DDR. Alternatively, for other example configurations, the host device and the SD device may establish the communication rate (i.e., SDR or DDR) through communication of a different command, such as a CMD6 in the SD specification. For these other example configurations, the host device may send the other command (e.g., CMD6) to the SD device to establish whether SDR or DDR is used before sending the tuning command (CMD19). In a particular example configuration, in accordance with the SD specification, the host device may first send the data-line usage command (ACMD6) to switch the number of data lines, then the CMD6 to establish whether to communicate according to SDR or DDR, and then the tuning command (CMD19). Additionally, for some example configurations, upon receiving the tuning command (CMD19) from the host device, the SD device may send a response R1 back to the host device, and then send the data signals for edge alignment. For some example configurations, if the host device and the SD device initially attempt to perform the tuning operation according to DDR, and the host device is unable to successfully complete the tuning operation, the host device may determine to perform a subsequent tuning operation according to SDR, or may determine to disable the SD device. However, if the host device successfully performs the tuning operation, then the host device may send a command, such as another tuning command (CMD19), to the SD device to indicate to the SD device that the tuning operation has ended.

Figure 11:
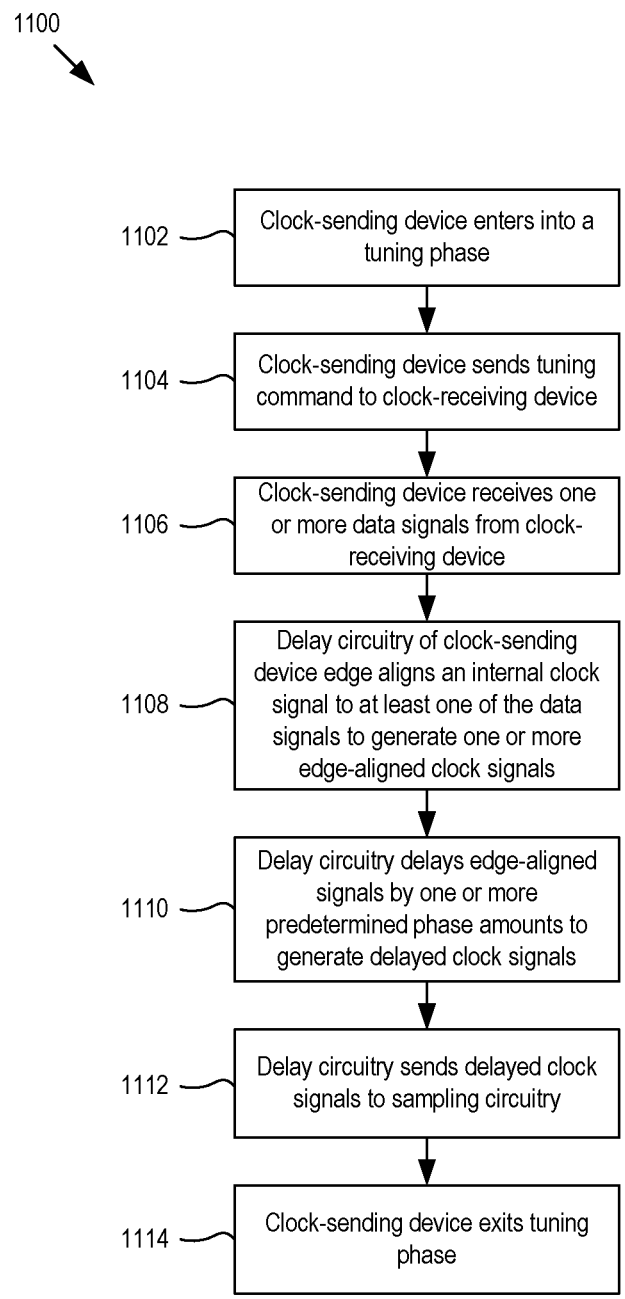
FIG. 11 is a flow chart of an example method of performing a tuning operation with a clock-sending device in communication with a clock-receiving device in a non-source-synchronous system.

FIG. 11 is a flow chart of an example method of performing a tuning operation with a clock-sending device in communication with a clock-receiving device via a communications bus. Together, the clock-sending device and the clock-receiving device may form a non-source synchronous system. Example clock-sending devices and clock-receiving devices that may be configured to perform the method 1100 may include those previously described with reference to FIGS. 1-10. At block 1102, the clock-sending device may determine to enter into a tuning phase to perform the tuning operation. The clock-sending device may be configured to make the determination in response to one or more of various triggering events, such as during or upon completion of an initialization sequence, completion of switching from communicating in 1-bit mode to a higher-bit mode (e.g., 4-bit or 8-bit), completion of establishing communication according to SDR or DDR with the clock-receiving device, entering into an idle phase, identifying one or more errors (e.g., CRC errors) upon receiving data from the clock-receiving device, or determining to send a clock signal to the clock-receiving device at a different clock frequency, as previously described. Other triggering events may be possible.

At block 1104, upon determining to enter the tuning phase, the clock-sending device may send a tuning command on a command line to the clock-receiving device to indicate to the clock-receiving device to enter into the tuning phase. In some example methods, the tuning command may indicate to the clock-receiving device whether to communicate according to SDR or DDR. In other example methods, the clock-sending device and the clock-receiving device may establish whether to communicate according to SDR or DDR prior to the clock-sending device sending the tuning command. In addition or alternatively, in some example methods, the tuning command may indicate the type of data pattern (e.g., a clock pattern or a predetermined pattern corresponding a particular bit sequence) for the data signals generated by the clock-receiving device during the tuning phase to have. At block 1106, the clock-sending device may receive one or more data signals used for edge alignment on data lines from the clock-receiving device. In some example methods, the one or more data signals may sent from the clock-receiving device according to the pattern indicated in the tuning command. In addition or alternatively, in some example methods, receiving the one or more data signals may include receiving only a single data signal on a single data line. In other example methods, receiving the one or more data signals may include receiving data signals on all of the data lines. In still other example methods, receiving the data signals may include receiving data signals on more than one but less than all of the data lines. In addition or alternatively, in some example methods, the clock-sending device may receive a response from the clock-receiving device on the command line before or concurrently with receiving the one or more data signals.

At block 1108, delay circuitry of the clock-sending device may edge align an internal clock signal to at least one of the one or more data signals received from the clock-receiving device in order to generate one or more edge-aligned clock signals. In some example methods, edge aligning may include edge aligning the internal clock signal to a single data signal, all of the data signals received on the data lines, or more than one but less than all of the data signals received on the data lines. In addition or alternatively, in some example methods, the clock-sending device may select which of the data signals to use for edge alignment. Additionally, where the devices communicate according to SDR, edge aligning may include edge aligning an edge (rising or falling) of the internal clock signal to only one of the edges (rising or falling) of each of the data signals used for edge alignment. Alternatively, where the devices communicate according to DDR, in some example methods, edge aligning may include edge aligning an edge (rising or falling) of the internal clock signal to both the rising edge and the falling edge of each of the data signals used for edge alignment, For other example methods where DDR is used, edge aligning may include edge aligning an edge (rising or falling) of the internal clock signal to one of the edges (rising or falling) of each of the data signals used for edge alignment. For these other example methods, the internal clock signal may be frequency divided in half, and the frequency divided clock signal may be used in the edge aligning. Also, in some example methods, the clock-sending device may perform the edge alignment with delay tap circuitry and DLL circuitry, as previously described.

At block 1110, the delay circuitry may delay the one or more edge-aligned clock signals by one or more predetermined phase amounts to generate one or more delayed clock signals. Each of the predetermined phase amounts may correspond and/or be equal to an amount to delay the edges used for sampling so that they are in desired or optimal sample locations, such as in the middle of a duration that a voltage of a data signal is held at a constant level. Example phase amounts may include 90 degrees, 180 degrees, or 270 degrees, as previously described. Where DDR is used for data communication, the edge alignment and delaying performed at blocks 1108 and 1110 may delay the internal clock signal to generate two delayed clock signals that are 180-degrees out of phase, which may be used to perform rising-edge sampling and falling-edge sampling of the same data signal outside of the tuning phase.

At block 1112, the delay circuitry may send the one or more delayed clock signals to sampling circuitry of the clock-sending device for sampling of data signals received from the clock-receiving device outside of the tuning phase. Depending on the configuration of the delay circuitry and how many delayed clock signals are generated, sampling circuitry configured to sample different data signals may receive the same delayed clock signal (i.e., a common delayed clock signal) or different delayed clock signals. Also, two sampling circuits configured to perform rising-edge sampling and falling-edge sampling of a same data signal may receive different delayed clock signals, one being 180-degrees out of phase from the other. At block 1114, the clock-sending device may exit the tuning phase and/or the tuning operation may end.

Figure 12:
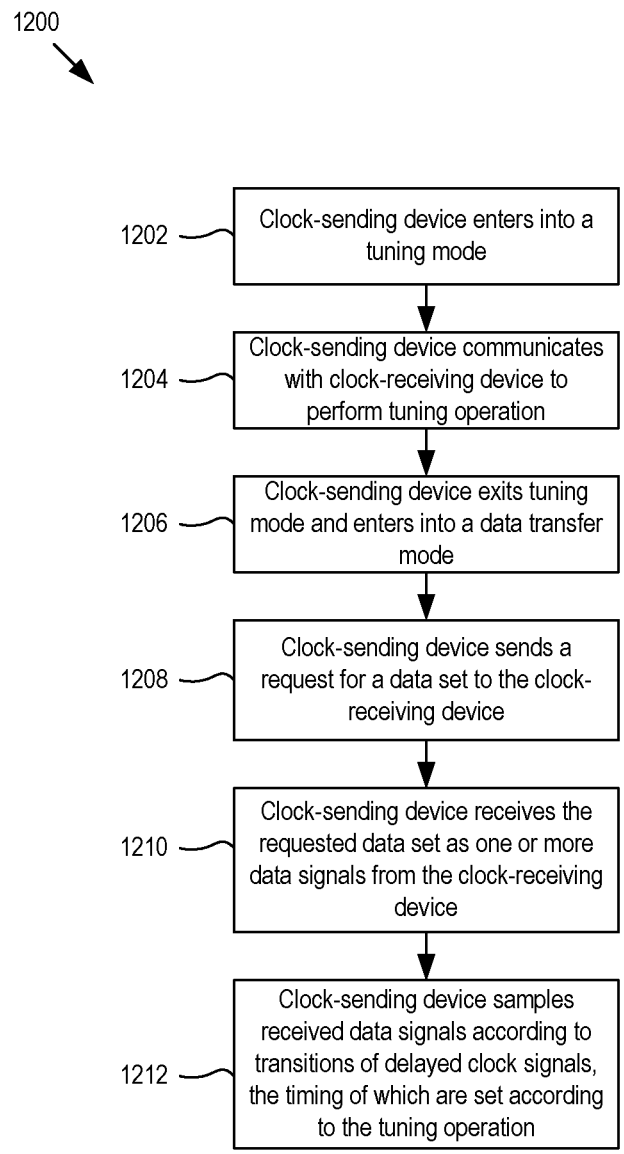
FIG. 12 is a flow chart of an example sampling method performed with a clock-sending device in communication with a clock-receiving device in a non-source-synchronous system.

FIG. 12 is a flow chart of an example sampling method 1200 performed with a clock-sending device of a non-source-synchronous system. Example clock-sending devices and clock-receiving devices that may be configured to perform the method 1200 may include those previously described with reference to FIGS. 1-10. At block 1202, the clock-sending device may enter into a tuning mode to perform a tuning operation. The clock-sending device may determine to enter into the tuning mode in response to a triggering event, such as those previously described. At block 1204, the clock-sending device may communicate with a clock-receiving device to perform a tuning operation in the tuning mode, such as by edge-aligning an internal clock signal to one or more data signals received on one or more data lines of a communications bus to generate one or more delayed clock signals, as previously described. At block 1206, after performing the tuning operation, the clock-sending device may exit the tuning phase and enter into a normal operation mode and/or a data transfer mode. At block 1208, the clock-sending device may send a host request to receive a data set from the clock-receiving device, which may be storing the data. At block 1210, the clock-sending device may receive the requested data set as one or more data signals on the data lines from the clock-receiving device. At block 1212, sampling circuitry of the clock-sending device may sample levels of the one or more data signals to identify the bit values of the requested data. The sampling circuitry may sample the data signals according to transitions of one or more delayed clock signals received from clock delay circuitry used in the tuning operation performed at block 1204. The timing of the transitions of the delayed clocks signals used to sample the data signals at block 1210 may be set according to the tuning operation performed at block 1204.

Figure 13:
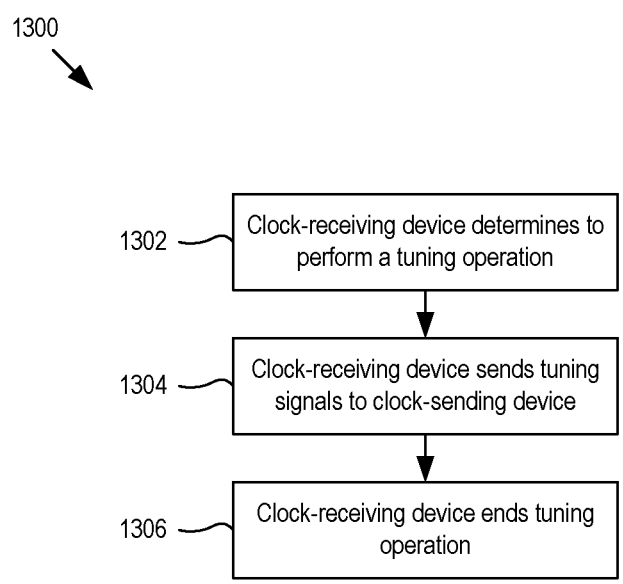
FIG. 13 is a flow chart of an example method of performing a tuning operation with a clock-receiving device in communication with a clock-sending device in a non-source-synchronous system.

FIG. 13 is a flow chart of an example method 1300 of performing a tuning operation with a clock-receiving device in communication with a clock-sending device via a communications bus. Together, the clock-sending device and the clock-receiving device may form a non-source synchronous system. Example clock-sending devices and clock-receiving devices that may be configured to perform the method 1300 may include those previously described with reference to FIGS. 1-10. At block 1302, the clock-receiving device may determine to perform a tuning operation with the clock-sending device. For some example methods, the clock-receiving device may make the determination in response to receiving a tuning command on a command line of the communications bus from the clock-sending device.

At block 1304, in response to determining to perform the tuning operation, the clock-receiving device may send tuning signals to the clock-sending device. In particular, the clock-receiving device may send one or more data signals on one or more data lines of the communications bus. For some example methods, the clock-receiving device may send one data signal on one data line. In other example methods, the clock-receiving device may send data signals on all of the data lines. In still other example methods, the clock-receiving device may send multiple data signals on more than one but less than all of the data lines. In addition, the data signals that the clock-receiving device sends may be generated using pulses of a host clock signal received from the clock-sending device, such as on a clock line of the communications bus.

Also, as previously described, each of the data signals may have a data pattern. For example methods where multiple data signals are sent, the data signals may be the same or different from each other. Additionally, in some example methods, each of the data signals sent may have a clock pattern. In addition or alternatively, the waveforms of each of the data signals that are sent may depend on whether the clock-receiving device communicates with the clock-sending device according to SDR or DDR. For DDR communication, where each of the data signals sent has a clock pattern, the clock-receiving device may generate the data signals to be at a first voltage level on the rising edge of the received host clock signal and at a second voltage level on the falling edge of the received host clock signal, where the first and second voltage levels correspond to different logic levels (i.e., one corresponds to logic high ("1") and the other corresponds to logic low ("0")).

Additionally, the clock-receiving device may send the one or more data signals in various ways and/or according to a particular format. In some example methods, the length or number of pulses of a single data signal sent on a single data line may correspond to a predetermined size or number of bits. In addition or alternatively, a single data signal sent on a single line may include one or more of various portions, including a first portion indicating a start of the data signal (e.g., a start bit), a second portion that includes the data pattern used by the clock-sending device for tuning, a third portion used for error detection and/or correction (e.g., CRC bits), and a fourth portion indicating an end of the data signal (e.g., an end bit).

In addition, for some example methods, the clock-receiving device may send a predetermined number of single data signals on a single data line in response to receipt of a tuning command on the command line. For example, for a given data line, the clock-receiving device may send only one data signal on the given data line per tuning command, or alternatively may send multiple data signals on the given data line per tuning command. Thereafter, the clock-sending device may not send more data signals on the given data line unless it receives another tuning command from the clock-sending device. In other example methods, the clock-sending device may continuously send data signals on a given data line until the clock-receiving device receives a stop command from the clock-sending device.

Also, for some example methods, in addition to sending the one or more data signals on the one or more data lines, the clock-receiving device may send a response on the command line back to the clock-sending device in order to acknowledge the tuning command.

At block 1306, after the clock-receiving device sends the tuning signals to the clock-sending device, the tuning operation may end.

Example methods other than those described with reference to FIGS. 11-13 may be performed with a clock-sending device and a clock-receiving device of a non-source-synchronous system, including methods that combine the actions performed in the methods 1100, 1200, 1300 of FIGS. 11, 12, 13, respectively.

The non-source-synchronous systems and related methods as described with reference to FIGS. 1-13 edge-align the internal clock signal CLK_INT of the clock-sending device to one or more edges of one or more data signals received from the clock-receiving device during a tuning operation in order to generate one or more delayed clock signals used for sampling. Other non-source-synchronous systems may not perform edge-alignment in order to generate delayed clock signals. Instead, during their respective tuning operations, the clock-receiving device of these other non-source-synchronous systems may send one or more data signals that have a predetermined data pattern corresponding to a predetermined bit sequence of "0" and "1" logic values. The internal clock signal may be sent to clock delay circuitry, which may delay the internal clock signal by a certain amount. That delayed clock signal may then be used to sample the data signals with the predetermined data pattern in order to generate sampled data signals, which the sampling circuitry may then send to the core logic circuitry of the clock-sending device. The core logic circuitry may then identify the data pattern yielded from the sampling with the predetermined data pattern. If the data patterns match, then the core logic circuitry may determine that the amount of delay provided by the clock delay circuitry is satisfactory for sampling. Alternatively, if the data patterns do not match, then the delay circuitry may adjust the amount of delay to delay the internal clock signal and the clock-sending device may request that the clock-receiving device send another round of data signals with the predetermined data pattern for sampling. The clock-sending device and the clock-receiving device may continuously perform this process until the data pattern that the core logic circuitry identifies from the sampled signals matches the predetermined data pattern.

The tuning operations performed by these other non-source-synchronous systems may be time consuming as several iterations of sending data signals and comparing the sets of data patterns may be required before the right amount of delay is set to achieve matching data patterns. In some tuning operations, an iteration limit is reached before matching occurs. In comparison, the edge-alignment performed with the embodiments described with reference to FIGS. 1-13 may provide for faster tuning to achieve optimal sampling points.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A clock-sending device comprising:
a clock generator configured to generate an internal clock signal;
input/output circuitry configured to:
generate a host clock signal based on the internal clock signal and send the host clock signal to a clock-receiving device; and
receive a first data signal from the clock-receiving device, the first data signal generated based on the host clock signal;
clock delay circuitry comprising:
a delay tap circuit configured to delay the internal clock signal to generate an edge-aligned clock signal that is edge-aligned with the first data signal;
a phase shift circuit configured to delay the edge-aligned clock signal by a predetermined phase amount to generate a delayed clock signal; and
a switch configured to connect an output of the delay tap circuit to an input of the phase shift circuit in response to the edge-alignment between the edge-aligned clock signal and the first data signal; and
sampling circuitry configured to sample a second data signal received from the clock-receiving device according to transitions of the delayed clock signal.

2. The clock-sending device of claim 1, wherein the edge-aligned clock signal comprises a first edge-aligned clock signal, and wherein the clock delay circuitry is configured to edge align the internal clock signal to a rising edge of the first data signal to generate the first edge-aligned clock signal, and wherein the clock delay circuitry is further configured to edge align the internal clock signal to a falling edge of the first data signal to generate a second edge-aligned clock signal, and
wherein the sampling circuitry is further configured to sample the second data signal based on the first edge-aligned clock signal and based on the second edge-aligned clock signal.

3. The clock-sending device of claim 1, wherein the predetermined phase amount is substantially equal to 90 degrees where the clock-sending device and the clock-receiving device are configured to communicate according to double data rate (DDR), and wherein the predetermined phase amount is substantially equal to 180 degrees where the clock-sending device and the clock-receiving device are configured to communicate according to single data rate (SDR).

4. The clock-sending device of claim 1, wherein the delayed clock signal comprises a first delayed clock signal and the predetermined phase amount comprises a first predetermined phase amount, and wherein the clock delay circuitry is further configured to delay the edge-aligned clock signal by a second phase amount to generate a second delayed clock signal,
  wherein the sampling circuitry is further configured to sample the second data signal based on the first delayed clock signal and based on the second delayed clock signal.

5. The clock-sending device of claim 4, wherein the first predetermined phase amount is substantially equal to 90 degrees and the second phase amount is substantially equal to 270 degrees.

6. The clock-sending device of claim 1,
  wherein the input/output circuitry is further configured to receive the second data signal from a first data line of a communications bus connecting the clock-sending device and the clock-receiving device,
  wherein the input/output circuitry is further configured to receive a third data signal from a second data line of the communications bus, and
  wherein the sampling circuitry is further configured to sample the third data signal based on the delayed clock signal.

7. The clock-sending device of claim 1, wherein the delayed clock signal comprises a first delayed clock signal,
  wherein the input/output circuitry is further configured to receive a third data signal from the clock-receiving device, the third data signal generated based on the host clock signal,
  wherein the clock delay circuitry is further configured to delay the internal clock signal based on the third data signal to generate a second delayed clock signal, and
  wherein the sampling circuitry is further configured to sample a fourth data signal based on the second delayed clock signal.

8. The clock-sending device of claim 1, wherein the first data signal comprises a clock pattern.

9. The clock-sending device of claim 1, wherein the clock delay circuitry is further configured to delay the internal clock signal by an amount based on a loop delay associated with the clock-sending device and the clock-receiving device.

10. The clock-sending device of claim 1, wherein the clock delay circuitry is further configured to set an amount of delay to delay the internal clock signal during a tuning operation, and wherein the sampling circuitry is further configured to sample the second data signal after the tuning operation is complete.

11. The clock-sending device of claim 10, further comprising:
  core logic circuitry configured to determine to perform the tuning operation,
  wherein the input/output circuitry is further configured to:
    send a tuning command to the clock-receiving device in response to the determination; and
    receive the first data signal from the clock-receiving device in response to sending the tuning command.

12. The clock-sending device of claim 11, wherein the core logic circuitry is further configured to determine to perform the tuning operation in response to a triggering event, wherein the triggering event comprises one of: completing a change of a data line usage number, completing an establishment of whether to communicate according to single data rate (SDR) or double data rate (DDR), determining to change a frequency of the internal clock signal, identifying errors in a received data set, or entering into an idle mode.

13. The clock-sending device of claim 1, wherein the clock-receiving device comprises a secure digital (SD) device.

14. The clock-sending device of claim 1, wherein the input/output circuitry is connected to the clock-receiving device via a communications bus that does not include a strobe line.

15. A tuning method comprising:
  edge aligning, with a delay tap circuit of clock delay circuitry of a first device, an internal clock signal to a first data signal received from a second device to generate an edge-aligned clock signal;
  connecting, with a switch of the clock delay circuitry, an output of the delay tap circuit to an input of a phase shift circuit of the clock delay circuitry when the edge aligning is complete;
  in response to the connecting, delaying, with the phase shift circuit, the edge-aligned clock signal by a predetermined phase amount to generate a delayed clock signal; and
  sampling, with sampling circuitry of the first device, a second data signal according to transitions of the delayed clock signal.

16. The tuning method of claim 15, wherein the edge-aligned clock signal comprises a first edge-aligned clock signal, wherein edge aligning the internal clock signal comprises edge aligning, with the clock delay circuitry, the internal clock signal to a rising edge of the first data signal to generate the first edge-aligned clock signal, and wherein the method further comprises:
  edge aligning, with the clock delay circuitry, the internal clock signal to a falling edge of the first data signal to generate a second edge-aligned clock signal,
  wherein sampling the second data signal comprises:
    sampling, with a first sampling circuit of the sampling circuitry, the second data signal based on the first edge-aligned clock signal; and
    sampling, with a second sampling circuit of the sampling circuitry, the second data signal based on the second edge-aligned clock signal.

17. The tuning method of claim 15, wherein the delayed clock signal comprises a first delayed clock signal and the predetermined phase amount comprises a first predetermined phase amount, and wherein the method further comprises delaying, with the clock delay circuitry, the edge aligned-clock signal by a second predetermined phase amount to generate a second delayed clock signal,
  wherein sampling the second data signal comprises:
    sampling, with a first sampling circuit of the sampling circuitry, the second data signal based on the first delayed clock signal; and
    sampling, with a second sampling circuit of the sampling circuitry, the second data signal based on the second delayed clock signal.

18. The tuning method of claim 15, further comprising:
  receiving, with input/output circuitry of the first device, the second data signal from a first data line of a communications bus connecting the first device and the second device;
  receiving, with the input/output circuitry, a third data signal from a second data line of the communications bus; and
  sampling, with the sampling circuitry, the third data signal based on the edge-aligned clock signal.

19. The tuning method of claim 15, wherein the edge-aligned clock signal comprises a first edge-aligned clock signal, the method further comprising:
  receiving, with the clock delay circuitry, a third data signal from the second device;
  edge aligning, with the clock delay circuitry, the internal clock signal to the third data signal to generate a second edge-aligned clock signal; and
  sampling, with the sampling circuitry, a fourth data signal based on the second edge-aligned clock signal.

20. The tuning method of claim 15, wherein the first data signal comprises a clock pattern.

21. The tuning method of claim 15, wherein edge aligning the internal clock signal comprises edge aligning the internal clock signal during a tuning operation, and wherein sampling the second data signal comprises sampling the second data signal after the tuning operation is complete.

22. The tuning method of claim 21, further comprising:
  determining, with core logic circuitry of the first device, to perform the tuning operation;
  sending, with input/output circuitry of the first device, a tuning command to the second device; and
  receiving, with the input/output circuitry, the first data signal from the second device in response to sending the tuning command.

23. The tuning method of claim 22, wherein determining to perform the tuning operation comprises determining, with the core logic circuitry, to perform the tuning operation in response to a triggering event, wherein the triggering event comprises one of: completing a change of a data line usage number, completing an establishment of whether to communicate according to single data rate (SDR) or double data rate (DDR), determining to change a frequency of the internal clock signal, identifying errors in a received data set, or entering into an idle mode.

24. The tuning method of claim 15, wherein the first device comprises a host device and the second device comprises a secure digital (SD) device.

25. The tuning method of claim 15, wherein the first device and the second device form a non-source-synchronous system.

26. A tuning method comprising:
  dynamically delaying, with a delay tap circuit of clock delay circuitry of a first device, an internal clock signal to generate a delayed clock signal until the delayed clock signal is an edge-aligned clock signal that is edge aligned to a first data signal;
  in response to the edge-aligned clock signal edge aligned to the first data signal, connecting, with a switch, an output of the delay tap circuit to an input of a phase shift circuit;
  in response to the connecting, phase shifting, with the phase shift circuit, the edge-aligned clock signal a predetermined phase amount to generate a delayed internal clock signal; and
  sampling, with sampling circuitry of the first device, a second data signal based on the delayed internal clock signal.

27. A clock-sending device comprising:
  means for generating an internal clock signal;
  means for generating a host clock signal based on the internal clock signal and for sending the host clock signal to a clock-receiving device;
  means for receiving a first data signal from the clock-receiving device, the first data signal generated based on the host clock signal;
  means for delaying the internal clock signal until the internal clock signal is edge-aligned with the first data signal to generate an edge-aligned clock signal;
  means for phase-shifting the edge-aligned clock signal a predetermined phase amount to generate a delayed clock signal;
  means for connecting the means for delaying with the means for phase-shifting in response to the edge-aligned clock signal edge-aligned to the first data signal; and
  means for sampling a second data signal received from the clock-receiving device based on the delayed clock signal.

28. A clock-sending device comprising:
  a clock generator configured to generate an internal clock signal;
  input/output circuitry configured to:
    generate a host clock signal based on the internal clock signal and send the host clock signal to a clock-receiving device; and
    receive a first data signal from the clock-receiving device, the first data signal generated based on the host clock signal;
  clock delay circuitry configured to:
    edge align the internal clock signal to a rising edge of the first data signal to generate a first edge-aligned clock signal;
    delay the first edge-aligned clock signal by a predetermined phase amount to generate a delayed clock signal; and
    edge align the internal clock signal to a falling edge of the first data signal to generate a second edge-aligned clock signal; and
  sampling circuitry configured to sample a second data signal received from the clock-receiving device based on the first edge-aligned clock signal and the second edge-aligned clock signal, and according to transitions of the delayed clock signal.

29. A clock-sending device comprising:
  a clock generator configured to generate an internal clock signal;
  input/output circuitry configured to:
    generate a host clock signal based on the internal clock signal and send the host clock signal to a clock-receiving device;
    receive a first data signal from the clock-receiving device, the first data signal generated based on the host clock signal; and
    receive a second data signal from the clock-receiving device, the second data signal generated based on the host clock signal;
  clock delay circuitry configured to:
    edge align the internal clock signal to the first data signal to generate an edge-aligned clock signal; and
    delay the internal clock signal based on the second data signal to generate a delayed clock signal; and
  sampling circuitry configured to:
    sample a third data signal received from the clock-receiving device based on the edge-aligned clock signal; and
    sample a fourth data signal based on the delayed clock signal.

30. A clock-sending device comprising:
  a clock generator configured to generate an internal clock signal;
  input/output circuitry configured to:

generate a host clock signal based on the internal clock signal and send the host clock signal to a clock-receiving device; and receive a first data signal from the clock-receiving device, the first data signal generated based on the host clock signal;

clock delay circuitry configured to:

edge align the internal clock signal to the first data signal to generate an edge-aligned clock signal; and delay the internal clock signal by an amount based on a loop delay associated with the clock-sending device and the clock-receiving device; and sampling circuitry configured to sample a second data signal received from the clock-receiving device based on the edge-aligned clock signal.

* * * * *

UNITED STATES PATENT AND TRADEMARK OFFICE
CERTIFICATE OF CORRECTION

PATENT NO. : 10,129,012 B2
APPLICATION NO. : 15/473067
DATED : November 13, 2018
INVENTOR(S) : Krishnamurthy Dhakshinamurthy et al.

Page 1 of 1

It is certified that error appears in the above-identified patent and that said Letters Patent is hereby corrected as shown below:

On the Title Page

Item (72), replace "Yosi" with --Yoseph--

Signed and Sealed this
Tenth Day of November, 2020

Andrei Iancu
*Director of the United States Patent and Trademark Office*